US 6,690,861 B2
Feb. 10, 2004

(12) United States Patent
Yoneda

(10) Patent No.: US 6,690,861 B2
(45) Date of Patent: Feb. 10, 2004

(54) ARRAYED WAVEGUIDE GRATING, ARRAYED WAVEGUIDE GRATING MODULE, ARRAYED WAVEGUIDE GRATING MODULE WAVEGUIDE COMPENSATION METHOD, OPTICAL COMMUNICATION SYSTEM

(75) Inventor: Shigeru Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 10/001,812

(22) Filed: Dec. 5, 2001

(65) Prior Publication Data
US 2002/0067890 A1 Jun. 6, 2002

(30) Foreign Application Priority Data
Dec. 6, 2000 (JP) ........................... 2000-371434

(51) Int. Cl.$^7$ ................................. G02B 6/34
(52) U.S. Cl. ............................ 385/37; 398/117
(58) Field of Search ................. 372/6, 69, 92; 385/1, 14–19, 24, 37, 127, 128, 147; 398/79, 87, 118, 119, 117, 115, 121

(56) References Cited

U.S. PATENT DOCUMENTS 6,324,318 B1 * 11/2001 Suzuki ................... 385/24
6,577,782 B1 *  6/2003 Leaird et al. ........... 385/15

FOREIGN PATENT DOCUMENTS

| JP | 08-251105 | 9/1996 |
| JP | 9-49936 | 2/1997 |
| JP | 10-303815 | 11/1998 |
| JP | 11-014858 | 1/1999 |
| JP | 2000-162453 | 6/2000 |

OTHER PUBLICATIONS

K. Maru et al., "Athermal arrayed–waveguide grating multi/demultiplexer", Transactions of Institute of Electronics and Data Communication Engineers of Japan, Optoelectronic System Laboratory, Hitachi Cable, Ltd., C–3–76, 2000, p. 256.

P.C. Clemens, et al., "Wavelength–Adaptable Optical Phased Array in SiO2–Si" IEEE Photonics Technology Letters, vol. 7, No. 10, Oct. 1995, pp. 1040–1041.

Year 2000 Electronics Information Academic Communication Society Conference B–10–78, p. 301 (no date).

* cited by examiner

Primary Examiner—Akm Enayet Ullah
(74) Attorney, Agent, or Firm—McGinn & Gibb, PLLC

(57) ABSTRACT

An arrayed waveguide grating 101 is shown, which comprises at least one input waveguide 103, a plurality of output waveguides 104, at least one wavelength compensation output waveguide 105 disposed adjacent to the output waveguide 104, a channel waveguide array 107, an input side slab-waveguide 108, and an output side slab-waveguide 109. The wavelength compensation output waveguide 105 has a tapering connecting portion connected to the output side slab-waveguide 105. Thus, the outputted light has a sharp spectrum, thus permitting ready wavelength compensation.

18 Claims, 13 Drawing Sheets

ARRAYED WAVEGUIDE GRATING, ARRAYED WAVEGUIDE GRATING MODULE, ARRAYED WAVEGUIDE GRATING MODULE WAVEGUIDE COMPENSATION METHOD, OPTICAL COMMUNICATION SYSTEM

BACKGROUND OF THE INVENTION

This application claims benefit of Japanese Patent Application No. 2000-371434 filed on Dec. 6, 2000, the contents of which are incorporated by the reference.

The present invention relates to arrayed waveguide grating, arrayed waveguide grating module, arrayed waveguide grating module waveguide compensation method, optical communication device and optical communication system and, more particularly, to the arrayed waveguide grating, which permits ready selection of wavelength to be used, the arrayed waveguide grating module using such arrayed waveguide grating, the arrayed waveguide grating module wavelength compensation method of compensating in the arrayed waveguide grating module and the optical communication unit and the optical communication system.

In optical fiber communication systems, further transfer capacity increase has been called for together with transmission data capacity increase. In DWDM (Dense Wavelength Division Multiplexing), the importance of the optical wavelength filter as multiplexing/demultliplexing device for multiplexing and demultiplexing wavelengths has been increasing.

Optical wavelength filters are of various types. Among the optical wavelength filters, the arrayed waveguide gratings have narrow wavelength characteristic and high extinguishing ratio, and they further have features as multiple-input multiple-output filter device. Thus, the optical wavelength filters capable of demultilexing the multiplexed signals and performing inverse operation, and thus it can readily constitute a multiplexing/demultiplexing device. By using quarts waveguide for the arrayed waveguide grating, it is possible to obtain excellent coupling to optical fiber and realize low insertion loss operation with an insertion loss of several dB (decibels). The arrayed waveguide grating has attracting attention as particularly important device among the optical wavelength filters, and its extensive home and abroad researches and investigations are in force.

FIG. 18 shows the overall construction of a prior art arrayed waveguide grating. The arrayed waveguide grating 10 as shown comprises, formed on a substrate 11, one or more input waveguides 12, a plurality of output waveguides 13, a channel waveguide array 14 curved in a predetermined direction with different radii of curvature, an input side slab-waveguide 15 inter-connecting the input waveguides 12 and the channel waveguide array 14, and an output side slab-waveguide 16 inter-connecting the channel waveguide art 14 and the output waveguides 13. A multiplexed light signal inputted from the input waveguide or waveguides 12 to the input side slab-waveguide 15 is expanded as it passes therethrough and then inputted to the channel waveguide array 14.

The channel waveguide array 14 includes a plurality of arrayed waveguides with lengths progressively increasing or decreasing by a predetermined waveguide length difference. The light signals passing through the these arrayed waveguides reach the output side slab-waveguide 16 one after another by a predetermined phase difference internal.

Actually, however, wavelength dispersion is present, and the in-phase plane is tilted independence on the wavelength. Consequently, the light signals are focused (i.e., converged) on different positions on the interface between the output side slab-waveguide 16 and the output waveguides 13. With the output waveguides 13 disposed at the positions corresponding to the respective wavelengths, it is possible to take out a desired wavelength component from the output waveguides 13.

In the meantime, in such arrayed waveguide grating 10, the wavelength selection should be performed in conformity to the grid of the ITU (International Telecommunication Union). The wavelength of the arrayed waveguide grating 10, by the way, is very susceptible to the refractive index changes of the waveguide material. This means that the center wavelength as selected wavelength is subject to variations due to fluctuations in a film formation process as manufacturing process. Therefore, it is frequently impossible to obtain a value as desired. Also, the selected wavelength variation poses a problem that the optical loss with the wavelength in use is increased. Accordingly, it has been in practice to do wavelength compensation to a proper value by some means after completion of the arrayed waveguide grating.

For example, according to Japanese Patent Laid-Open No. 9-49936 an input/output waveguides for wavelength compensation are provided in addition to the normal input/output waveguides based on AWG arrayed waveguide, and are changed according to the wavelength compensation amount.

Denoting the demultiplication direction angle difference with respect to the wavelength difference by $\delta\lambda$, in the arrayed waveguide grating it is possible to compensate for the center wavelength $\lambda_{in}$ by an amount given by the following equation (1) by changing the positions of the output waveguides 12, i.e., the slab incidence angle $\theta_{in}$.

$$\delta\lambda_{in}=(\delta\lambda/\delta\theta)\cdot\theta_{in} \quad (1)$$

The input/output waveguides, however, are disposed discretely. Therefore, the wavelength compensation amount is also discrete, and it is possible to obtain wavelength compensation as desired. In order to obtain the wavelength compensation amount as desired, it is necessary to set the slab incidence angle $\theta_{in}$ as desired.

According to Japanese Patent Laid-Open No. 2000-162453, the selected wavelength center is shifted by irradiating an AWG array part with infrared rays and thus changing the refractive index of the irradiated art. According to P. C. Clemens et al, IEEE Photon. Tech. Lett., Vol. 7, No. 10, pp. 1040–1041, 1955 and Transactions of Institute of Electronics and Data Communication Engineers of Japan, C-3-76, 2000, the selected wavelength compensation is performed by changing the position of light incidence on an input side slab-waveguide.

FIG. 19 shows the construction of an arrayed waveguide grating, which does selected wavelength compensation by changing the position of incidence of light on an input side slab-waveguide. In the proposal in the above P. C. Clemens et al, IEEE, Photon, Tech. LETT., Vol. 7, No. 10, pp. 1040–1041, 1995, the AWG wafer 21 of the substrate is severed at an input side slab-incidence part 22. The slab-incidence part 22 is reinforced with glass, and an input fiber 24 which is also reinforced with glass is bonded (i.e., secured by adhesive) to the slab-incidence part 22. At the time of the bonding, the centering is performed directly, and the position of the input fiber 24 is changed as desired in correspondence to the wavelength compensation amount.

FIG. 20 shows what is proposed in the Transactions of Institute of Electronics and Data Communication Engineers of Japan, C-3-76, 2000. This proposal is different from the above structure described in connection with FIG. 19, in which the input fiber 24 is bonded to the slab-incidence part 22. As shown in FIG. 20, an input fiber 31 is connected via a slab-introduction optical waveguide 32 to the input side slab-waveguide 33. The input and output side slab-waveguides 33 and 34 are formed on an AWG element wafer 35, and a channel waveguide array 36 is connected between these slab-waveguides. Output waveguides 38 are connected between the output side slab-waveguide 34 and a fiber array 37.

In addition to the above proposals, it is in practice to change the temperature of mainly the channel waveguide array part (see channel waveguide array 14 shown in FIG. 18) of the arrayed waveguide grating and change the wavelength by adjusting the refractive index width a thermo-optical effect thus obtained. To this end, a temperature controller such as a Velch element or a heater is used.

When carrying out such arrayed wavelength grating wavelength compensation as to match the ITU grid by the above various proposals or method, such high accuracy compensation with an error of several pm (picometers) is required. This demand is on an increasing trend together with the progress of the dense wavelength division multiplexing as noted above.

FIG. 21 shows an example of the spectrum shape of the light signal outputted from the arrayed waveguide grating. In the Figure, the ordinate is taken for the light signal output level of the arrayed waveguide grating, and the abscissa is taken from the wavelength. It is assumed that the same light signal output level has two different spectrum shapes 41 and 42. Of these spectrum shape, the relatively sharp spectrum shape 41 shown by dashed curve is capable of readily detecting the center wavelength. On the other hand, with the duller spectrum shape 42 it is difficult to detect the center wavelength. This means that in this case the accuracy of the center wavelength compensation is deteriorated.

FIG. 22 shows a different example of the spectrum shape of the light signal outputted from the arrayed waveguide grating. Of the two spectrum shapes 43 and 44 in this example, although their light signal output level integrals are equal, the spectrum shape 43 has a clear top, while the other spectrum shape 44 has a rather flat top. In order to reduce the loss variations in the ITU grid band as much as possible, a flat top shape such as the spectrum shape 44 is preferred. In this case, however, a problem is posed that the accuracy of the center wavelength compensation is deteriorated.

While problems in the arrayed waveguide grating have been discussed above, the same problems are also present in the arrayed waveguide grating module, optical communication device and optical communication system using such arrayed waveguide grating.

SUMMARY OF THE INVENTION

An object of the present invention, therefore, is to provide arrayed waveguide grating, arrayed waveguide grating module using such arrayed waveguide grating and arrayed waveguide grating module wavelength compensation method used for wavelength compensation in such arrayed waveguide grating module, which permit accurate center wavelength compensation of each waveguide in an arrayed waveguide grating, an arrayed waveguide grating module using such arrayed waveguide grating, an arrayed waveguide grating module waveguide compensation method use for wavelength compensation in such arrayed waveguide grating module, and optical communication device and optical communication system using such arrayed waveguide grating.

Various aspects and advantages thereof of the present invention which will be summarized as follows:

According to a first aspect of the present invention, there is provided an arrayed waveguide grating comprising: one or more input waveguides; an input side slab-waveguide connected to the output side of the input waveguide or waveguides; a plurality of arrayed waveguides formed on the side of the input side slab-waveguide opposite the input waveguide or waveguides; an output side slab-waveguide connected to the other terminal of the arrayed waveguides; a plurality of first output waveguides connected to the output side slab-waveguide on the side thereof opposite the arrayed waveguides; and at least one second output waveguide formed together with the first output waveguides on the side of the output side slab-waveguide opposite the arrayed waveguides; the afore-said components being all formed on a substrate and the second output waveguide outputting an optical spectrum different from the optical spectral outputted from the other output waveguides.

In this embodiment, from the second output waveguide or waveguides among a plurality of output waveguide disposed on the output side of the arrayed waveguide grating, an output light signal spectrum different from the output light signal spectra from the other output waveguides are obtained, and they are used for center wavelength compensation of each waveguide of the arrayed waveguide grating.

According to a second aspect of the present invention, there is provided an arrayed waveguide grating comprising: one or more input waveguides; an input side slab-waveguide connected to the output side of the input waveguide or waveguides; a plurality of arrayed waveguides formed on the side of the input side slab-waveguide opposite the input waveguide or waveguides; an output side slab-waveguide connected to the other terminal of the arrayed waveguides; a plurality of first output waveguides connected to the output side slab-waveguide on the side thereof opposite the arrayed waveguides; and at least one second output waveguide formed together with the first output waveguides on the side of the output side slab-waveguide opposite the arrayed waveguides; the afore-said components being all formed on a substrate and a connecting portion of the second output waveguide with respect to the output side slab-waveguide having a shape different from the shape of connecting portions of the first output waveguides with respect to the output side slab-waveguide.

In this embodiment, the connecting portion of the output waveguide disposed as second output waveguide among a plurality of output waveguides on the output side of the arrayed waveguide grating has a shape different from the shape of the connecting portion of the output waveguides as the output waveguides. By using these waveguides, the center wavelength compensation of each waveguide of the arrayed waveguide grating can be performed appropriately by changing the spectrum shape or like means.

According to a third aspect of the present invention, there is provided the arrayed waveguide grating according to one of the first and second aspects, wherein the second output waveguide constituting the output waveguides is a monitor light waveguide for wavelength monitoring.

In this embodiment, the second output waveguide is used as, for instance, a wavelength monitor.

According to a fourth aspect of the present invention, there is provided the arrayed waveguide grating according to the first aspect, wherein the second output waveguide constituting the output waveguides outputs an output spectrum having a narrower spectral width than the spectral width of the output optical spectra of the first output waveguides.

In this embodiment, the spectrum width of the spectrum of the light signal outputted from the second output waveguide is narrow compared to the usual waveguides as output waveguides. It is thus possible to readily specify the center wavelength, and the range in which errors occur is small.

According to a fifth aspect of the present invention, there is provided the arrayed waveguide grating according to the first aspect, wherein the second output waveguide constituting the output waveguides outputs an optical spectrum having a sharper peak than the peak of the optical spectra of the first output waveguides.

In this embodiment, the spectrum of the light signal outputted from the second output waveguide has a sharp peak compared to the usual waveguides as the output waveguides.

According to a sixth aspect of the present invention, there is provided the arrayed waveguide grating according to the second aspect, wherein the second output waveguide is a monitor light output waveguide and has a tapering connecting portion connected to the output side slab-waveguide.

In this embodiment, the terminal portion of the monitor light signal output waveguide connected to the output side slab-waveguide is tapering. Thus, the spectrum width is narrow, and a sharp spectrum is obtainable. However, the extent of tapering of the terminal portion is limited.

According to a seventh aspect of the present invention, there is provided the arrayed waveguide grating according to the second aspect, wherein the second output waveguide is a monitor light output waveguide and has a straight connecting portion with a fixed width direction dimension and connected to the output side slab-waveguide, and the first output waveguides constituting the output waveguides have terminal portions with progressively increasing width direction dimensions as one approaches the output side slab-waveguide.

In this embodiment, the monitor light signal output waveguide itself has a straight terminal portion connected to the output side slab-waveguide, while the first output waveguides each have a flaring terminal portion connected to the output side slab-waveguide. The terminal portion of the monitor light signal output waveguide connected to the output side slab-waveguide thus may not be necessarily tapering so long as it is made thin compared to the terminal portions of the first output waveguides.

According to an eighth aspect of the present invention, there is provided the arrayed waveguide grating according to the second aspect, wherein the waveguides constituting the output waveguides have terminal portions with progressively increasing width direction dimensions as one approaches the output side slab-waveguide, the terminal portions of the first output waveguides having width direction dimensions increasing at an increased rate.

In this embodiment, it is shown that the monitor light signal output waveguide constituting part of the output waveguides has the flaring connecting portion connected to the output side slab-waveguide. Again in this case, it is important in view of obtaining a satisfactory spectrum shape that the extent of flaring is less than the terminal portion of each first output waveguide.

According to a ninth aspect of the present invention, there is provided an arrayed waveguide grating module comprising: an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the optical spectrum outputted from the second output waveguide being different from the optical spectra outputted from the other output waveguides; and optical fibers each having one terminal optically connected to at least part of the plurality of waveguides constituting the output waveguides of the arrayed waveguide grating.

In this embodiment, this arrayed waveguide grating module is obtained by combining optical fibers and other components in the arrayed waveguide grating as set forth in connection with the first aspect of the present invention. The other component may be a temperature control circuit for controlling the temperature of the arrayed waveguide grating. This arrayed waveguide grating module also permits accurate center wavelength compensation of each output waveguide of the arrayed waveguide grating.

According to a tenth aspect of the present invention, there is provided an arrayed waveguide grating module comprising: an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the shape of the connecting portion of the second output waveguide with respect to the output side slab-waveguide being different from the shape of the connecting portion of the second output waveguides with respect to the output side slab-waveguide; and optical fibers each having one terminal optically connected to at least part of the plurality of waveguides constituting the output waveguides of the arrayed waveguide grating.

In this embodiment, this arrayed waveguide grating module is obtained by combining optical fibers and other components in the arrayed waveguide grating as set forth in connection with the second aspect of the present invention. The other component may be a temperature control circuit for controlling the temperature of the arrayed waveguide grating. This arrayed waveguide grating module also permits accurate center wavelength compensation of each output waveguide of the arrayed waveguide grating.

According to an eleventh aspect of the present invention, there is provided a wavelength compensation method in an arrayed waveguide grating module comprising: a monitor light inputting step of inputting a monitor light for check from either one of the input waveguides with respect to an arrayed waveguide grating module with an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the optical spectrum outputted from the second output waveguide being different from the optical spectra outputted from the other output waveguides; and a wavelength compensation step of performing wavelength compensation with respect to the lights outputted from the first waveguides at the time of the light input from the input waveguides by detecting the monitor light outputted from the second output waveguide on the basis of the monitor light inputting step.

In this embodiment, this wavelength compensation method uses the arrayed waveguide grating module having the arrayed waveguide grating as set forth in connection with the first aspect of the present invention. The wavelength compensation is performed by inputting the monitor light signal for checking from either one of the input waveguides and detecting the monitor light signal outputted from the second output waveguide.

According to a twelfth aspect of the present invention, there is provided a wavelength compensation method in an arrayed waveguide grating module comprising: a monitor light inputting step of inputting a monitor light for check from either one of the input waveguides with respect to an arrayed waveguide grating module with an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and a connecting portion of the second output waveguide with respect to the output side slab-waveguide having a shape different from the shape of connecting portions of the first output waveguides with respect to the output side slab-waveguide; and a wavelength compensation step of performing wavelength compensation with respect to the lights outputted from the first waveguides at the time of the light input from the input waveguides by detecting the monitor light outputted from the second output waveguide on the basis of the monitor light inputting step.

In this embodiment, this wavelength compensation method uses the arrayed waveguide grating module having the arrayed waveguide grating as set forth in connection with the second aspect of the present invention. The wavelength compensation is performed by inputting the monitor light signal for checking from either one of the input waveguides and detecting the monitor light signal outputted from the second output waveguide.

According to a thirteenth aspect of the present invention, there is provided a wavelength compensation method in an arrayed waveguide grating module comprising: a monitor light inputting step of inputting a monitor light for check from either one of the input waveguides with respect to an arrayed waveguide grating module with an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the second output waveguide outputting an optical spectrum different from the optical spectral outputted from the other output waveguides; an adjusting step of adjusting the arrayed waveguide grating module such that the second output waveguide outputs a monitor light having a predetermined wavelength when the monitor light is inputted in the monitor light inputting step; and a signal processing starting step of starting a signal processing by inputting actually used lights from the input waveguides of the arrayed waveguide grating module adjusted in the adjusting step and using wavelength compensated lights outputted from the first output waveguides of the arrayed waveguide grating.

In this embodiment, this wavelength compensation method uses the arrayed waveguide grating module having the arrayed waveguide grating as set forth in connection with the first aspect of the present invention. The wavelength compensation is performed by inputting the monitor light signal for checking from either one of the input waveguides and detecting the monitor light signal outputted from the second output waveguide. Subsequently, a signal processing by inputting the actually used light signals from the adjusted arrayed waveguide grating module and using the wavelength compensated light signals outputted from the first output waveguides of the arrayed waveguide grating.

According to a fourteenth aspect of the present invention, there is provided a wavelength compensation method in an arrayed waveguide grating module comprising: a monitor light inputting step of inputting a monitor light for check from either one of the input waveguides with respect to an arrayed waveguide grating module with an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and a connecting portion of the second output waveguide with respect to the output side slab-waveguide having a shape different from the shape of connecting portions of the first output waveguides with respect to the output side slab-waveguide; an adjusting step of adjusting the arrayed waveguide grating module such that the second output waveguide outputs a monitor light having a predetermined wavelength when the monitor light is inputted in the monitor light inputting step; and a signal processing starting step of starting a signal processing by inputting actually used lights from the input waveguides of the arrayed waveguide grating module adjusted in the adjusting step and using wavelength compensated lights outputted from the first output waveguides of the arrayed waveguide grating.

In this embodiment, this wavelength compensation method uses the arrayed waveguide grating module having the arrayed waveguide grating as set forth in connection with the second aspect of the present invention. The wavelength compensation is performed by inputting the monitor light signal for checking from either one of the input waveguides and detecting the monitor light signal outputted from the second output waveguide. Subsequently, a signal processing by inputting the actually used light signals from the adjusted arrayed waveguide grating module and using the wavelength compensated light signals outputted from the first output waveguides of the arrayed waveguide grating.

According to a fifteenth aspect of the present invention, there is provided a wavelength compensation method in an arrayed waveguide grating module according to one of claims 13 and 14, wherein in the adjusting step the arrayed waveguide grating module is adjusted by controlling the temperature of the arrayed waveguide grating by using a temperature control circuit assembled in the arrayed waveguide grating module such that the second output waveguide outputs a monitor light having a predetermined wavelength.

In this embodiment, in the wavelength compensation method in the arrayed waveguide grating module as set forth in connection with the thirteenth and fourteenth aspects of the present invention, the temperature of the arrayed waveguide grating is adjusted when matching the wavelength by using the monitor light signal. The wavelength compensation may also be made with any other method.

According to a sixteenth aspect of the present invention, there is provided an optical communication system comprising: an arrayed waveguide grating module including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the optical spectrum outputted from the second output waveguide being different from the optical spectra outputted from the other output waveguides, optical fibers each having one terminal optically connected to at least part of the output side of each of a plurality of waveguides constituting the output waveguides of the arrayed waveguide grating, and a temperature control circuit for controlling at least temperature of the channel waveguide of the arrayed waveguide grating; a monitor light inputting means, to which a monitor light for check is inputted from either one of the input waveguides at the time of checking the arrayed waveguide grating module; an adjusting step of adjusting the arrayed waveguide grating module such that the second output waveguide outputs a monitor light having a predetermined wavelength when the monitor light is inputted in the monitor light inputting means; and a signal processing starting means of starting a signal processing by inputting actually used lights from the input waveguides of the arrayed waveguide grating module adjusted in the adjusting means and using wavelength compensated lights outputted from the first output waveguides of the arrayed waveguide grating.

In this embodiment, in this optical communication system, which uses an arrayed waveguide grating module having the arrayed waveguide grating as set forth in connection with the first aspect of the present invention, at the time of checking the arrayed waveguide grating module, the arrayed waveguide grating module is adjusted by inputting a monitor light signal for checking form either one of the input waveguides such that the monitor light signal outputted from the second output waveguide has a predetermined wavelength. A signal processing using the wavelength compensated light signals outputted from the first output waveguides of the arrayed waveguide grating, is then started by inputting the actually used light signals from the input waveguides of the arrayed waveguide grating module.

According to a seventeenth aspect of the present invention, there is provided an optical communication system comprising: an arrayed waveguide grating module including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and a connecting portion of the second output waveguide with respect to the output side slab-waveguide having a shape different from the shape of connecting portions of the first output waveguides with respect to the output side slab-waveguide, optical fibers each having one terminal optically connected to at least part of the output side of each of a plurality of waveguides constituting the output waveguides of the arrayed waveguide grating, and a temperature control circuit for controlling at least temperature of the channel waveguide of the arrayed waveguide grating; a monitor light inputting means, to which a monitor light for check is inputted from either one of the input waveguides at the time of checking the arrayed waveguide grating module; an adjusting step of adjusting the arrayed waveguide grating module such that the second output waveguide outputs a monitor light having a predetermined wavelength when the monitor light is inputted in the monitor light inputting means; and a signal processing starting means of starting a signal processing by inputting actually used lights from the input waveguides of the arrayed waveguide grating module adjusted in the adjusting means and using wavelength compensated lights outputted from the first output waveguides of the arrayed waveguide grating.

In this embodiment, in this optical communication system, which uses an arrayed waveguide grating module having the arrayed waveguide grating as set forth in connection with the first aspect of the present invention, at the time of checking the arrayed waveguide grating module, the arrayed waveguide grating module is adjusted by inputting a monitor light signal for checking form either one of the input waveguides such that the monitor light signal outputted from the monitor light waveguide has a predetermined wavelength. A signal processing using the wavelength compensated light signals outputted from the first output waveguides of the arrayed waveguide grating, is then started by inputting the actually used light signals from the input waveguides of the arrayed waveguide grating module.

According to an eighteenth aspect of the present invention, there is provided an optical communication system comprising: an optical transmitting means for transmitting lights having individual wavelengths as parallel signals; a multiplexer constituted by an arrayed waveguide grating for multiplexing the optical signals with the individual wavelengths transmitted from the optical transmitting means; a light transmitting line, along which the multiplexed light outputted from the multiplexer is transmitted; a node having the array waveguide grating appropriately arranged in the light transmitting line; a demultiplexer for demultiplexing the light transmitted from the light transmitting line via the node in order to separate the lights of respective wavelengths; an optical receiving means for receiving the demultiplexed light with the individual wavelengths outputted from the demultiplexer; the demultiplexer being an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the light inputted to the second output waveguide having a spectrum shape different from the spectrum shape of the lights inputted to the first output waveguides.

In this embodiment, in the optical communication system comprising a light signal transmitting means for transmitting light signals of different signals, a multiplexer constituted by an arrayed waveguide grating for multiplexing the light signals of the individual wavelengths outputted form the light signal transmitting means, a light signal transmitting line for transmitting the multiplexed light signal outputted from the multiplexer, a node disposed on the light signal transmitting line on an appropriate position thereof and including an arrayed waveguide grating, a demultiplexer constituted by an arrayed waveguide grating for demultiplexing the inputted light signal transmitted along the light signal transmitting line and through the node to separate the light signals of the individual wavelengths, and a light signal receiving means for receiving the separated light signals of the individual wavelengths from the demultilplexer, the demultiplexer is constituted by the arrayed waveguide grating as set forth in connection with the first aspect of the present invention.

According to a nineteenth aspect of the present invention, there is provided an optical communication system comprising: an optical transmitting means for transmitting lights having individual wavelengths as parallel signals; a multiplexer constituted by an arrayed waveguide grating for multiplexing the optical signals with the individual wavelengths transmitted from the optical transmitting means; a light transmitting line, along which the multiplexed light outputted from the multiplexer is transmitted; a node having the array waveguide grating appropriately arranged in the light transmitting line; a demultiplexer for demultiplexing the light transmitted from the light transmitting line via the node in order to separate the lights of respective wavelengths; an optical receiving means for receiving the demultiplexed light with the individual wavelengths outputted from the demultiplexer; the demultiplexer being an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and a connecting portion of the second output waveguide with respect to the output side slab-waveguide having a shape different from the shape of connecting portions of the first output waveguides with respect to the output side slab-waveguide.

In this embodiment, in the optical communication system comprising a light signal transmitting means for transmitting light signals of different signals, a multiplexer constituted by an arrayed waveguide grating for multiplexing the light signals of the individual wavelengths outputted form the light signal transmitting means, a light signal transmitting line for transmitting the multiplexed light signal outputted from the multiplexer, a node disposed on the light signal transmitting line on an appropriate position thereof and including an arrayed waveguide grating, a demultiplexer constituted by an arrayed waveguide grating for demultiplexing the inputted light signal transmitted along the light signal transmitting line and through the node to separate the light signals of the individual wavelengths, and a light signal receiving means for receiving the separated light signals of the individual wavelengths from the demultilplexer, the demultiplexer is constituted by the arrayed waveguide grating as set forth in connection with the second aspect of the present invention.

According to a twentieth aspect of the present invention, there is provided an optical communication system comprising: a first arrayed waveguide grating including a transmission line loop having a plurality of nodes connected one after another in the form of a loop by respective transmission lines, the nodes each demultiplexing a multiplexed light to separate a light having a corresponding wavelength, and a second arrayed waveguide grating multiplexing the separated lights of the individual wavelengths; the first arrayed waveguide grating being an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the second output waveguide outputting an optical spectrum different from the optical spectral outputted from the other output waveguides.

In this embodiment, in the optical communication system, which comprises the first arrayed waveguide grating including a transmission line loop having a plurality of nodes connected to one another in a loop fashion by respective transmission lines, a multiplexed light signal being transmitted to each of the transmission lines, the nodes each demultiplexing the multiplexed light signal to separate the light signals of the individual wavelengths, and a second arrayed waveguide grating for multiplexing the separated light signals of the individual wavelengths, the first arrayed waveguide grating is the arrayed waveguide grating as set forth in connection with the first aspect of the present invention. It is thus possible to obtain wavelength compensation using the second output waveguide.

According to a twenty-first aspect of the present invention, there is provided an optical communication system comprising: a first arrayed waveguide grating including a transmission line loop having a plurality of nodes connected one after another in the form of a loop by respective transmission lines, the nodes each demultiplexing a multiplexed light signal to separate a light signal having a corresponding wavelength, and a second arrayed waveguide grating multiplexing the separated light signals of the individual wavelengths; the first arrayed waveguide grating being an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and a connecting portion of the second output waveguide with respect to the output side slab-waveguide having a shape different from the shape of connecting portions of the first output waveguides with respect to the output side slab-waveguide.

In this embodiment, in the optical communication system, which comprises the first arrayed waveguide grating including a transmission line loop having a plurality of nodes connected to one another in a loop fashion by respective transmission lines, a multiplexed light signal being transmitted to each of the transmission lines, the nodes each demultiplexing the multiplexed light signal to separate the light signals of the individual wavelengths, and a second arrayed waveguide grating for multiplexing the separated light signals of the individual wavelengths, the first arrayed waveguide grating is the arrayed waveguide grating as set forth in connection with the second aspect of the present invention. It is thus possible to obtain wavelength compensation using the second output waveguide.

According to a twenty-second aspect of the present invention, there is provided the optical communication system according to one of the eighteenth to twenty-first, wherein a wavelength meter for wavelength monitoring in presetting the wavelength of at least one monitor light inputted to the at least one input waveguide of the first arrayed waveguide grating to a predetermined value when the monitor is inputted, is connected to the second output waveguide.

In this embodiment, the exclusive wavelength meter for monitoring the monitor light signal is used.

According to a twenty-third aspect of the present invention, there is provided the optical communication system according to one of the eighteenth to twenty-first aspects, comprising: a wavelength meter for being connected to the second output waveguide when a monitor light is inputted to the at least one input waveguide of the first arrayed waveguide grating; an adjusting means for adjusting the arrayed waveguide grating module such that the monitor light measured in the wavelength meter has a predetermined wavelength; and a signal processing starting means for starting a signal processing by causing the input of the actually used lights from the input waveguides of the arrayed waveguide grating module adjusted by the adjusting means and using the wavelength compensated lights outputted from the output waveguides of the arrayed waveguide grating.

In this embodiment, the optical communication system comprises a wavelength meter necessary for wavelength compensation for an arrayed waveguide grating module, an adjusting means for adjusting the arrayed waveguide grating module by using the wavelength meter, and a signal processing starting means for starting a signal processing using the wavelength compensated light signals.

According to a twenty-fourth aspect of the present invention, there is provided an optical communication system comprising: an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and the optical spectrum outputted from the second output waveguide being different from the optical spectra outputted from the other output waveguides, and optical fibers each having one terminal optically connected to at least part of each of the plurality of waveguides constituting the output waveguides of the arrayed waveguide grating; and a module compensating means including a Mach zender circuit, in which a free spectral range as a interval corresponding to one cycle period of loss wavelength characteristic is preset as a desired optical frequency range, and to which the monitor light outputted from the second output waveguide is inputted when the monitor light is inputted to the at least one input waveguide of the first waveguide grating array, a first and a second photo-diodes for receiving respective beams branched out from the output side of the Mach zender circuit, a computing means for taking the ratio between the sum of the output currents from the two photo-diodes and the output current from either one of the two diodes, a deviation detecting means for detecting a wavelength deviation from the computed ratio, an adjusting means for adjusting the arrayed waveguide grating module by using the detection output from the deviation detecting means such that the monitor lights have a predetermined wavelength, and a signal processing starting means for starting a signal processing by causing input of the actually used lights from the input waveguides of the arrayed waveguide grating module adjusted by the adjusting means and using the wavelength compensated lights outputted from the first output waveguides of the arrayed waveguide grating.

In this embodiment, the optical communication device is constituted by using the first and second photo-diodes in the arrayed waveguide grating module as set forth in connection with ninth aspect of the present invention and also using a module compensating means for wavelength compensation by using a so-called wavelength detection locker. The wavelength meter itself is expensive, and the present invention as set forth in connection with the twenty fourth aspect of the present invention permits cost reduction of the optical communication device itself or an optical communication system using the same optical communication device.

According to a twenty-fifth aspect of the present invention, there is provided an optical communication system comprising: an arrayed waveguide grating including one or more input waveguides, an input side slab-waveguide connected to the output side of the input waveguide or waveguides, a plurality of arrayed waveguides formed on the side of the input side slab-waveguide opposite the input waveguide or waveguides, an output side slab-waveguide connected to the other terminal of the arrayed waveguides, a plurality of first output waveguides connected to the output side slab-waveguide on the side thereof opposite the arrayed waveguides and at least one second output waveguide formed together with the first output waveguides on the side of the output side slab-waveguide opposite the arrayed waveguides, the afore-said components being all formed on a substrate and a connecting portion of the second output waveguide with respect to the output side slab-waveguide having a shape different from the shape of connecting portions of the first output waveguides with respect to the output side slab-waveguide, and optical fibers each having one terminal optically connected to at least part of each of the plurality of waveguides constituting the output waveguides of the arrayed waveguide grating; and a module compensating means including a Mach zender circuit, in which a free spectral range as a interval corresponding to one cycle period of loss wavelength characteristic is preset as a desired optical frequency range, and to which the monitor light outputted from the second output waveguide is inputted when the monitor light is inputted to the at least one input waveguide of the first waveguide grating array, a first and a second photo-diode for receiving respective beams branched out from the output side of the Mach zender circuit, a computing means for taking the ratio between the sum of the output currents from the two photo-diodes and the output current from either one of the two diodes, a deviation detecting means for detecting a wavelength deviation from the computed ratio, an adjusting means for adjusting the arrayed waveguide grating module by using the detection output from the deviation detecting means such that the monitor lights have a predetermined wavelength, and a signal processing starting means for starting a signal processing by causing input of the actually used light signals from the input waveguides of the arrayed waveguide grating module adjusted by the adjusting means and using the wavelength compensated lights outputted from the first output waveguides of the arrayed waveguide grating.

In this embodiment, the optical communication device is constituted by using the first and second photo-diodes in the arrayed waveguide grating module as set forth in connection with tenth aspect of the present invention and also using a module compensating means for wavelength compensation by using a so-called wavelength detection locker. The wavelength meter itself is expensive, and the present invention as set forth in connection with the twenty fifth aspect of the present invention permits cost reduction of the optical communication device itself or an optical communication system using the same optical communication device.

According to a twenty-sixth aspect of the present invention, there is provided an arrayed waveguide grating comprising: at least one input waveguides; an input side slab-waveguide with the input side thereof connected to the output side of the input waveguide or waveguides; a channel waveguide array including a plurality of waveguides with lengths progressively increasing by a predetermined waveguide length difference, the input side of the waveguides being connected to the output side of the input side slab-waveguide; an output side slab-waveguide with the input side thereof connected to the output side of the plurality of waveguides constituting the channel waveguide array; and a plurality of waveguides as output waveguides each having one terminal connected to the output side of the output side slab-waveguide, the optical spectrum of the light outputted from a second waveguide as one of the output waveguides being different from the optical spectrum of the lights outputted from first waveguides as the remaining output waveguides.

In this embodiment, a light signal spectrum different from the light signal spectrum outputted from the first waveguides, among the output waveguides connected to the output side slab-waveguide provided in the output side of the arrayed waveguide grating, is obtained from the second waveguide, and it is used for center wavelength compensation of each waveguide of the arrayed waveguide grating.

According to a twenty-seventh aspect of the present invention, there is provided an arrayed waveguide grating comprising: at least one input waveguides; an input side slab-waveguide with the input side thereof connected to the output side of the input waveguide or waveguides; a channel waveguide array including a plurality of waveguides with lengths progressively increasing by a predetermined waveguide length difference, the input side of the waveguides being connected to the output side of the input side slab-waveguide; an output side slab-waveguide with the input side thereof connected to the output side of the plurality of waveguides constituting the channel waveguide array; and a plurality of waveguides as output waveguides each having one terminal connected to the output side of the output side slab-waveguide, a connecting portion of the second output waveguide with respect to the output side slab-waveguide having a shape different from the shape of connecting portions of the first output waveguides with respect to the output side slab-waveguide.

In this embodiment, a light signal spectrum different from the light signal spectrum outputted from the first waveguides, among the output waveguides connected to the output side slab-waveguide provided in the output side of the arrayed waveguide grating, is obtained from the second waveguide, and it is used for center wavelength compensation of each waveguide of the arrayed waveguide grating.

According to a twenty-eighth aspect of the present invention, there is provided the arrayed waveguide grating according to one of the twenty-sixth to twenty-seventh aspects, wherein the second output waveguide constituting the output waveguides is a monitor light waveguide for wavelength monitoring.

In this embodiment, the second output waveguide is used for the wavelength monitoring.

According to a twenty-ninth aspect of the present invention, there is provided the arrayed waveguide grating according to the twenty-sixth aspect, wherein the second output waveguide constituting the output waveguides outputs an output spectrum having a narrower spectral width than the spectral width of the output optical spectra of the first output waveguides.

In this embodiment, the spectrum width of the spectrum of the light signal outputted from the second output waveguide is narrow compared to the usual waveguides as output waveguides. It is thus possible to readily specify the center wavelength, and the range in which errors occur is small.

According to a thirtieth aspect of the present invention, there is provided the arrayed waveguide grating according to the twenty-sixth aspect, wherein the second output waveguide constituting the output waveguides outputs an optical spectrum having a sharper peak than the peak of the optical spectra of the first output waveguides.

In this embodiment, the spectrum of the light signal outputted from the second output waveguide has a sharp peak compared to the usual waveguides as the output waveguides.

According to a thirty-first aspect of the present invention, there is provided the arrayed waveguide grating according to the twenty-seventh aspect, wherein the second output waveguide is a monitor light output waveguide and has a tapering connecting portion connected to the output side slab-waveguide.

In this embodiment, the terminal portion of the monitor light signal output waveguide connected to the output side slab-waveguide is tapering. Thus, the spectrum width is narrow, and a sharp spectrum is obtainable. However, the extent of tapering of the terminal portion is limited.

According to a thirty-second aspect of the present invention, there is provided the arrayed waveguide grating according to the twenty-seventh aspect, wherein the second output waveguide is a monitor light output waveguide and has a straight connecting portion with a fixed width direction dimension and connected to the output side slab-waveguide, and the first output waveguides constituting the output waveguides have terminal portions with progressively increasing width direction dimensions as one approaches the output side slab-waveguide.

In this embodiment, the monitor light signal output waveguide itself has a straight terminal portion connected to the output side slab-waveguide, while the first output waveguides each have a flaring terminal portion connected to the output side slab-waveguide. The terminal portion of the monitor light signal output waveguide connected to the output side slab-waveguide thus may not be necessarily tapering so long as it is made thin compared to the terminal portions of the first output waveguides.

According to a thirty-third aspect of the present invention, there is provided the arrayed waveguide grating according to the twenty-seventh aspect, wherein the waveguides constituting the output waveguides have terminal portions with progressively increasing width direction dimensions as one approaches the output side slab-waveguide, the terminal portions of the first output waveguides having width direction dimensions increasing at an increased rate.

In this embodiment, it is shown that the monitor light signal output waveguide constituting part of the output waveguides has the flaring connecting portion connected to the output side slab-waveguide. Again in this case, it is important in view of obtaining a satisfactory spectrum shape that the extent of flaring is less than the terminal portion of each first output waveguide.

According to a thirty-fourth aspect of the present invention, there is provided an arrayed waveguide grating module comprising: an arrayed waveguide grating including at least one input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, the optical spectrum of the light outputted from a second waveguide as one of the output waveguides being different from the optical spectrum of the lights outputted from first waveguides as the remaining output waveguides; and optical fibers each having one terminal optically connected to at least part of the plurality of waveguides constituting the output waveguides of the arrayed waveguide grating.

In this embodiment, this arrayed waveguide grating module is obtained by combining optical fibers and other components in the arrayed waveguide grating as set forth in connection with the twenty-sixth aspect of the present invention. The other component may be a temperature control circuit for controlling the temperature of the arrayed waveguide grating. This arrayed waveguide grating module also permits accurate center wavelength compensation of each output waveguide of the arrayed waveguide grating.

According to a thirty-fifth aspect of the present invention, there is provided an arrayed waveguide grating module comprising: an arrayed waveguide grating including at least one input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal; connected to the output side of the output side slab-waveguide, a connecting portion of the second output waveguide with respect to the output side slab-waveguide having a shape different from the shape of connecting portions of the first output waveguides with respect to the output side slab-waveguide; and optical fibers each having one terminal optically connected to at least part of the plurality of waveguides constituting the output waveguides of the arrayed waveguide grating.

In this embodiment, this arrayed waveguide grating module is obtained by combining optical fibers and other components in the arrayed waveguide grating as set forth in connection with the twenty-seventh aspect of the present invention. The other component may be a temperature control circuit for controlling the temperature of the arrayed waveguide grating. This arrayed waveguide grating module also permits accurate center wavelength compensation of each output waveguide of the arrayed waveguide grating.

According to a thirty-sixth aspect of the present invention, there is provided a wavelength compensation method in an arrayed grating module having an arrayed waveguide grating which includes one or more input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, the optical spectrum of the light from a second waveguide, i.e., a monitor light waveguide, as one of the output waveguides connected to the input side of the output side slab-waveguide being different from the optical spectrum of the lights from first waveguides as the remaining output waveguides, the wavelength compensation method comprising a monitor light inputting step of inputting a monitor light for checking from either one of the input waveguides; and a wavelength compensation step of performing wavelength compensation with respect to the lights outputted from the first waveguides at the time of the light input from the input waveguides by detecting the monitor light outputted from the monitor waveguide on the basis of the monitor light inputting step.

In this embodiment, this wavelength compensation method uses the arrayed waveguide grating module having the arrayed waveguide grating as set forth in connection with the twenty-sixth aspect of the present invention. The wavelength compensation is performed by inputting the monitor light signal for checking from either one of the input waveguides and detecting the monitor light signal outputted from the second output waveguide.

According to a thirty-seventh aspect of the present invention, there is provided a wavelength compensation method in an arrayed grating module having an arrayed waveguide grating which includes one or more input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, a connecting portion of the second output waveguide, i.e., a monitor light waveguide, with respect to the output side slab-waveguide having a shape different from the shape of connecting portions of the first output waveguides with respect to the output side slab-waveguide; the wavelength compensation method comprising a monitor light inputting step of inputting a monitor light for checking from either one of the input waveguides; and a wavelength compensation step of performing wavelength compensation with respect to the lights outputted from the first waveguides at the time of the light input from the input waveguides by detecting the monitor light outputted from the monitor output waveguide on the basis of the monitor light inputting step.

In this embodiment, this wavelength compensation method uses the arrayed waveguide grating module having the arrayed waveguide grating as set forth in connection with the twenty-seventh aspect of the present invention. The wavelength compensation is performed by inputting the monitor light signal for checking from either one of the input waveguides and detecting the monitor light signal outputted from the second output waveguide.

According to a thirty-eighth aspect of the present invention, there is provided a wavelength compensation method in an arrayed grating module having an arrayed waveguide grating which includes one or more input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, the optical spectrum of the light from a second waveguide, i.e., a monitor light waveguide, as one of the output waveguides connected to the input side of the output side slab-waveguide being different from the optical spectrum of the lights from first waveguides as the remaining output waveguides; the wavelength compensation method comprising: a monitor light inputting step of inputting a monitor light for checking from either one of the input waveguides; an adjusting step of adjusting the arrayed waveguide grating module such that the monitor light waveguide outputs a monitor light having a predetermined wavelength when the monitor light is inputted in the monitor light inputting step; and a wavelength compensation step of performing wavelength compensation with respect to the lights outputted from the first waveguides at the time of the light input from the input waveguides by detecting the monitor light outputted from the monitor output waveguide on the basis of the monitor light inputting step.

In this embodiment, this wavelength compensation method uses the arrayed waveguide grating module having the arrayed waveguide grating as set forth in connection with the twenty-sixth aspect of the present invention. The wavelength compensation is performed by inputting the monitor light signal for checking from either one of the input waveguides and detecting the monitor light signal outputted from the second output waveguide. Subsequently, a signal processing by inputting the actually used light signals from the adjusted arrayed waveguide grating module and using the wavelength compensated light signals outputted from the first output waveguides of the arrayed waveguide grating.

According to a thirty-ninth aspect of the present invention, there is provided a wavelength compensation method in an arrayed grating module having an arrayed waveguide grating which includes one or more input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, a connecting portion of the second output waveguide, i.e., a monitor light waveguide, with respect to the output side slab-waveguide having a shape different from the shape of connecting portions of the first output waveguides with respect to the output side slab-waveguide; the wavelength compensation method comprising: a monitor light inputting step of inputting a monitor light for checking from either one of the input waveguides; an adjusting step of adjusting the arrayed waveguide grating module such that the monitor light waveguide outputs a monitor light having a predetermined wavelength when the monitor light is inputted in the monitor light inputting step; and a wavelength compensation step of performing wavelength compensation with respect to the lights outputted from the first waveguides at the time of the light input from the input waveguides by detecting the monitor light outputted from the monitor output waveguide on the basis of the monitor light inputting step.

In this embodiment, this wavelength compensation method uses the arrayed waveguide grating module having the arrayed waveguide grating as set forth in connection with the twenty-seventh aspect of the present invention. The wavelength compensation is performed by inputting the monitor light signal for checking from either one of the input waveguides and detecting the monitor light signal outputted from the second output waveguide. Subsequently, a signal processing by inputting the actually used light signals from the adjusted arrayed waveguide grating module and using the wavelength compensated light signals outputted from the first output waveguides of the arrayed waveguide grating.

According to a fortieth aspect of the present invention, there is provided the wavelength compensation method in an arrayed waveguide grating module according to one of the thirteenth to thirty-ninth aspects, wherein in the adjusting step the arrayed waveguide grating module is adjusted by using a temperature control circuit assembled in the arrayed waveguide grating module such that the monitor light waveguide outputs a monitor light having a predetermined wavelength.

In this embodiment, in the wavelength compensation method in the arrayed waveguide grating module as set forth in connection with the thirty-eighth and thirty-ninth aspects of the present invention, the temperature of the arrayed waveguide grating is adjusted when matching the wavelength by using the monitor light signal. The wavelength compensation may also be made with any other method.

According to a forty-first aspect of the present invention, there is provided an optical communication system comprising: an arrayed waveguide grating module including at least one input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal; connected to the output side of the output side slab-waveguide, the optical spectrum of the light outputted from a second waveguide, i.e., a monitor light waveguide, as one of the output waveguides being different from the optical spectrum of the lights outputted from the remaining output waveguides, optical fibers each having one terminal optically connected to at least part of the plurality of waveguides constituting the output waveguides of the arrayed waveguide grating, and a temperature control circuit for adjusting at least the temperature of the channel waveguide array of the arrayed waveguide grating; a monitor light inputting means for inputting a monitor light for checking from either one of the input waveguides at the time of the arrayed waveguide grating check; an adjusting means of adjusting the arrayed waveguide grating module such that the monitor waveguide outputs a monitor light having a predetermined wavelength when the monitor light is inputted in the monitor light inputting step; and a signal processing starting means of starting a signal processing by inputting actually used lights from the input waveguides of the arrayed waveguide grating module adjusted in the adjusting means and using wavelength compensated lights outputted from the first output waveguides of the arrayed waveguide grating.

In this embodiment, in this optical communication system, which uses an arrayed waveguide grating module having the arrayed waveguide grating as set forth in connection with the twenty-sixth aspect of the present invention, at the time of checking the arrayed waveguide grating module, the arrayed waveguide grating module is adjusted by inputting a monitor light signal for checking form either one of the input waveguides such that the monitor light signal outputted from the second output waveguide has a predetermined wavelength. A signal processing using the wavelength compensated light signals outputted from the first output waveguides of the arrayed waveguide grating, is then started by inputting the actually used light signals from the input waveguides of the arrayed waveguide grating module.

According to a forty-second aspect of the present invention, there is provided an optical communication system comprising: an arrayed waveguide grating module including at least one input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, a connecting portion of the monitor waveguide as the second output waveguide with respect to the output side slab-waveguide having a shape different from the shape of connecting portions of the first output waveguides with respect to the output side slab-waveguide, optical fibers each having one terminal optically connected to at least part of the plurality of waveguides constituting the output waveguides of the arrayed waveguide grating, and a temperature control circuit for adjusting at least the temperature of the channel waveguide array of the arrayed waveguide grating; a monitor light inputting means for inputting a monitor light for checking from either one of the input waveguides at the time of the arrayed waveguide grating check; an adjusting means of adjusting the arrayed waveguide grating module such that the monitor waveguide outputs a monitor light having a predetermined wavelength when the monitor light is inputted in the monitor light inputting step; and a signal processing starting means of starting a signal processing by inputting actually used lights from the input waveguides of the arrayed waveguide grating module adjusted in the adjusting means and using wavelength compensated lights outputted from the first output waveguides of the arrayed waveguide grating.

In this embodiment, in this optical communication system, which uses an arrayed waveguide grating module having the arrayed waveguide grating as set forth in connection with the twenty-seventh aspect of the present invention, at the time of checking the arrayed waveguide grating module, the arrayed waveguide grating module is adjusted by inputting a monitor light signal for checking form either one of the input waveguides such that the monitor light signal outputted from the second output waveguide has a predetermined wavelength. A signal processing using the wavelength compensated light signals outputted from the first output waveguides of the arrayed waveguide grating, is then started by inputting the actually used light signals from the input waveguides of the arrayed waveguide grating module.

According to a forty-third aspect of the present invention, there is provided an optical communication system comprising: an optical transmitting means for transmitting light signals having individual wavelengths as parallel signals; a multiplexer constituted by an arrayed waveguide grating for multiplexing the optical signals with the individual wavelengths transmitted from the optical transmitting means; a light transmitting line, along which the multiplexed light outputted from the multiplexer is transmitted; a node having the array waveguide grating appropriately arranged in the light transmitting line; a demultiplexer for demultiplexing the light transmitted from the light transmitting line via the node in order to separate the lights of respective wavelengths; an optical receiving means for receiving the demultiplexed light signal with the individual wavelengths outputted from the demultiplexer; the demultiplexer being an arrayed waveguide grating including one or more input waveguides, an input side slab-waveguide connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array, and a plurality of waveguides as output waveguides each having one terminal connected to the output side of the output side slab-waveguide, the optical spectrum of the light outputted from a second waveguide as one of the output waveguides being different from the optical spectrum of the lights outputted from first waveguides as the remaining output waveguides.

In this embodiment, in the optical communication system comprising a light signal transmitting means for transmitting light signals of different signals, a multiplexer constituted by an arrayed waveguide grating for multiplexing the light signals of the individual wavelengths outputted form the light signal transmitting means, a light signal transmitting line for transmitting the multiplexed light signal outputted from the multiplexer, a node disposed on the light signal transmitting line on an appropriate position thereof and including an arrayed waveguide grating, a demultiplexer constituted by an arrayed waveguide grating for demultiplexing the inputted light signal transmitted along the light signal transmitting line and through the node to separate the light signals of the individual wavelengths, and a light signal receiving means for receiving the separated light signals of the individual wavelengths from the demultilplexer, the demultiplexer is constituted by the arrayed waveguide grating as set forth in connection with the twenty-sixth aspect of the present invention.

According to a forty-fourth aspect of the present invention, there is provided an optical communication system comprising: an optical transmitting means for transmitting light signals having individual wavelengths as parallel signals; a multiplexer constituted by an arrayed waveguide grating for multiplexing the optical lights with the individual wavelengths transmitted from the optical transmitting means; a light transmitting line, along which the multiplexed light outputted from the multiplexer is transmitted; a node having the array waveguide grating appropriately arranged in the light transmitting line; a demultiplexer for demultiplexing the light transmitted from the light transmitting line via the node in order to separate the lights of respective wavelengths; an optical receiving means for receiving the demultiplexed light with the individual wavelengths outputted from the demultiplexer; the demultiplexer being an arrayed waveguide grating including one or more input waveguides, an input side slab-waveguide connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array, and a plurality of waveguides as output waveguides each having one terminal connected to the output side of the output side slab-waveguide, a connecting portion of the second output waveguide with respect to the output side slab-waveguide having a shape different from the shape of connecting portions of the first output waveguides with respect to the output side slab-waveguide.

In this embodiment, in the optical communication system comprising a light signal transmitting means for transmitting light signals of different signals, a multiplexer constituted by an arrayed waveguide grating for multiplexing the light signals of the individual wavelengths outputted form the light signal transmitting means, a light signal transmitting line for transmitting the multiplexed light signal outputted from the multiplexer, a node disposed on the light signal transmitting line on an appropriate position thereof and including an arrayed waveguide grating, a demultiplexer constituted by an arrayed waveguide grating for demultiplexing the inputted light signal transmitted along the light signal transmitting line and through the node to separate the light signals of the individual wavelengths, and a light signal receiving means for receiving the separated light signals of the individual wavelengths from the demultilplexer, the demultiplexer is constituted by the arrayed waveguide grating as set forth in connection with the twenty-seventh aspect of the present invention.

According to a forty-fifth aspect of the present invention, there is provided an optical communication system comprising: a first arrayed waveguide grating including a transmission line loop having a plurality of nodes connected one after another in the form of a loop by respective transmission lines, the nodes each demultiplexing a multiplexed light to separate a light having a corresponding wavelength, and a second arrayed waveguide grating multiplexing the separated lights of the individual wavelengths; the first arrayed waveguide grating being an element including one or more input waveguides, an input side slab-waveguide connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array, and a plurality of waveguides as output waveguides each having one terminal connected to the output side of the output side slab-waveguide, the optical spectrum of the light outputted from a second waveguide as one of the output waveguides being different from the optical spectrum of the lights outputted from first waveguides as the remaining output waveguides.

In this embodiment, in the optical communication system, which comprises a first arrayed waveguide grating including a transmission line loop having a plurality of nodes connected to one another in a loop fashion by respective transmission lines, a multiplexed light signal being transmitted to these transmission lines, the nodes each demultiplexing the multiplexed light signal to separate the light signals of the individual wavelengths, and a second arrayed waveguide grating for multiplexing the separated light signals of the individual wavelengths, the first arrayed waveguide grating is the arrayed waveguide grating as set forth in connection with the twenty-sixth aspect of the present invention.

According to a forty-sixth aspect of the present invention, there is provided an optical communication system comprising: a first arrayed waveguide grating including a transmission line loop having a plurality of nodes connected one after another in the form of a loop by respective transmission lines, the nodes each demultiplexing a multiplexed light signal to separate a light signal having a corresponding wavelength, and a second arrayed waveguide grating multiplexing the separated light signals of the individual wavelengths; the first arrayed waveguide grating being an element including one or more input waveguides, an input side slab-waveguide connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array, and a plurality of waveguides as output waveguides each having one terminal connected to the output side of the output side slab-waveguide, a connecting portion of the second output waveguide with respect to the output side slab-waveguide having a shape different from the shape of connecting portions of the first output waveguides with respect to the output side slab-waveguide.

In this embodiment, in the optical communication system, which comprises a first arrayed waveguide grating including a transmission line loop having a plurality of nodes connected to one another in a loop fashion by respective transmission lines, a multiplexed light signal being transmitted to these transmission lines, the nodes each demultiplexing the multiplexed light signal to separate the light signals of the individual wavelengths, and a second arrayed waveguide grating for multiplexing the separated light signals of the individual wavelengths, the first arrayed waveguide grating is the arrayed waveguide grating as set forth in connection with the twenty-seventh aspect of the present invention.

According to the forty-seventh aspect of the present invention, there is provided the optical communication system according to one of the forty-third to forty-sixth aspects, wherein a wavelength meter for wavelength monitoring in presetting the wavelength of at least one monitor light inputted to the at least one input waveguide of the first arrayed waveguide grating to a predetermined value when the monitor is inputted, is connected to the second output waveguide.

In this embodiment, the exclusive wavelength meter for monitoring the monitor light signal is used.

According to a forty-eighth aspect of the present invention, there is provided the optical communication system according to one of the forty-third to forty-sixth aspects, comprising: a wavelength meter for being connected to the second output waveguide when a monitor light is inputted to the at least one input waveguide of the first arrayed waveguide grating; an adjusting means for adjusting the arrayed waveguide grating module such that the monitor light measured in the wavelength meter has a predetermined wavelength; and a signal processing starting means for starting a signal processing by causing the input of the actually used light signals from the input waveguides of the arrayed waveguide grating module adjusted by the adjusting means and using the wavelength compensated lights outputted from the output waveguides of the arrayed waveguide grating.

In this embodiment, the optical communication system comprises a wavelength meter necessary for wavelength compensation for an arrayed waveguide grating module, an adjusting means for adjusting the arrayed waveguide grating module by using the wavelength meter, and a signal processing starting means for starting a signal processing using the wavelength compensated light signals.

According to a forty-ninth aspect of the present invention, there is provided an optical communication system comprising; an arrayed waveguide grating module including at least one input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, the optical spectrum of the light outputted from a second waveguide as one of the output waveguides being different from the optical spectrum of the lights outputted from first waveguides as the remaining output waveguides, and optical fibers each having one terminal optically connected to at least part of the plurality of waveguides constituting the output waveguides of the arrayed waveguide grating; and a module compensating means including a Mach zender circuit, in which a free spectral range as a interval corresponding to one cycle period of loss wavelength characteristic is preset as a desired optical frequency range, and to which the monitor light outputted from the second output waveguide is inputted when the monitor light is inputted to the at least one input waveguide of the first waveguide grating array, a first and a second photo-diodes for receiving respective beams branched out from the output side of the Mach zender circuit, a computing means for taking the ratio between the sum of the output currents from the two photo-diodes and the output current from either one of the two diodes, a deviation detecting means for detecting a wavelength deviation from the computed ratio, an adjusting means for adjusting the arrayed waveguide grating module by using the detection output from the deviation detecting means such that the monitor lights have a predetermined wavelength, and a signal processing starting means for starting a signal processing by causing input of the actually used light signals from the input waveguides of the arrayed waveguide grating module adjusted by the adjusting means and using the wavelength compensated lights outputted from the first output waveguides of the arrayed waveguide grating.

In this embodiment, the optical communication device is constructed by using the first and second photo-diodes in the arrayed waveguide grating module as set forth in connection with the thirty fourth aspect of the present invention and adding the module compensating means for wavelength compensation using the so-called wavelength detecting locker. The wavelength meter itself is expensive, and the fiftieth aspect of the present invention permits cost reduction of the optical communication device itself or the entire optical communication system using the optical communication device.

According to a fiftieth aspect of the present invention, there is provided an optical communication system comprising: an arrayed waveguide grating module having an arrayed waveguide grating including one or more input waveguides, an input side slab-waveguide with the input side thereof connected to the output side of the input waveguide or waveguides, a channel waveguide array including a plurality of waveguides with lengths progressively increasing by a predetermined waveguide length difference, the input side of the waveguides being connected to the output side of the input side slab-waveguide, an output side slab-waveguide with the input side thereof connected to the output side of the plurality of waveguides constituting the channel waveguide array and a plurality of output waveguides each having one terminal connected to the output side of the output side slab-waveguide, a connecting portion of the second output waveguide with respect to the output side slab-waveguide having a shape different from the shape of connecting portions of the first output waveguides with respect to the output side slab-waveguide, and optical fibers each having one terminal optically connected to at least part of the plurality of waveguides constituting the output waveguides of the arrayed waveguide grating; a module compensating means including a Mach zender circuit, in which a free spectral range as a interval corresponding to one cycle period of loss wavelength characteristic is preset as a desired optical frequency range, and to which the monitor light outputted from the second output waveguide is inputted when the monitor light is inputted to the at least one input waveguide of the first waveguide grating array, a first and a second photo-diodes for receiving respective beams branched out from the output side of the Mach zender circuit, a computing means for taking the ratio between the sum of the output currents from the two photo-diodes and the output current from either one of the two diodes, a deviation detecting means for detecting a wavelength deviation from the computed ratio, an adjusting means for adjusting the arrayed waveguide grating module by using the detection output from the deviation detecting means such that the monitor lights have a predetermined wavelength, and a signal processing starting means for starting a signal processing by causing input of the actually used lights from the input waveguides of the arrayed waveguide grating module adjusted by the adjusting means and using the wavelength compensated lights outputted from the first output waveguides of the arrayed waveguide grating.

In this embodiment, the optical communication device is constructed by using the first and second photo-diodes in the arrayed waveguide grating module as set forth in connection with the thirty-fifth aspect of the present invention and adding the module compensating means for wavelength compensation using the so-called wavelength detecting locker. The wavelength meter itself is expensive, and the fiftieth aspect of the present invention permits cost reduction of the optical communication device itself or the entire optical communication system using the optical communication device.

Other objects and features will be clarified from the following description with reference to attached drawings.

PREFERRED EMBODIMENTS OF THE INVENTION

Preferred embodiments of the present invention will now be described with reference to the drawings.

Figure 1:
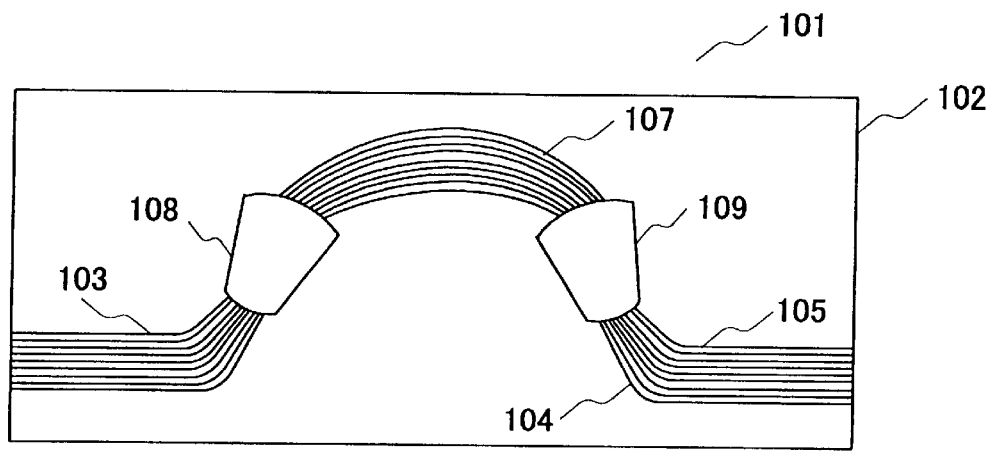
FIG. 1 is a plan view showing an arrayed wavelength grating as a first embodiment of the present invention.

FIG. 1 shows an arrayed wavelength grating as a first embodiment of the present invention. This arrayed waveguide grating 101 comprises, formed on a substrate 102, one or more input waveguides 103, a plurality of output waveguides 104, one or more wavelength compensation output waveguides 105 disposed adjacent to the output waveguides 104, a channel waveguide array 107 including a plurality of waveguides with lengths progressively increasing by a predetermined waveguide length difference, an input side slab-waveguide 108 inter-connecting the input waveguides 103 and the channel waveguide array 107, and the output side slab-waveguide 109 inter-connecting the channel waveguide array 107, the output waveguides 104 and the wavelength compensation output waveguides 105. A multiplexed light signal inputted from the input waveguide or waveguides 103 is expanded as it passes therethrough and then inputted to the channel waveguide array 107. The incident light level is not the same at the individual light incidence positions of the channel waveguide array 107, but it increases as one goes toward the center and is substantially in Gauss distribution.

The channel waveguide array 107 has waveguides with such lengths that a predetermined waveguide length difference is provided between adjacent ones, that is, the lengths progressively increase or decrease by that difference. Thus, the lights passing through the individual array waveguides reach the output side slab-waveguide 109 at predetermined phase difference intervals. Actually, wavelength dispersion is present, and the in-phase plane is tilted in dependence on the wavelength. Consequently, the lights are focused (or converged) at positions varying with the wavelength on the interface between the output side slab-waveguide 109 and the output waveguides 104 and wavelength compensation output waveguide 105. The output waveguides 104 are disposed at positions corresponding to respective wavelengths. The wavelength compensation waveguide 105 is used for center wavelength detection and compensation. It is thus possible to take out a given wavelength component from the output waveguides 104. The wavelength compensation output waveguide 105 is used for center wavelength detection and compensation. The wavelength compensation output waveguide 105 is used for wavelength compensation to set the wavelengths taken out from the output waveguides 104 to respective desired values.

Figure 2:
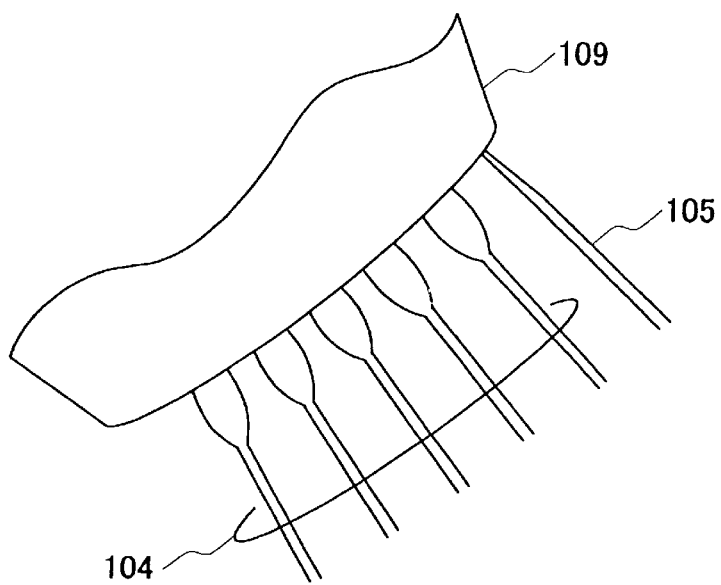
FIG. 2 is, to an enlarged scale, a plan view showing the neighborhood of the output terminal of the output side slab-waveguide in the arrayed waveguide grating of first embodiment.

FIG. 2 shows, to an enlarged scale, the neighborhood of the output terminal of the output side slab-waveguide in the arrayed waveguide grating of this embodiment. The plurality of output waveguides 104 which are actually used for product and the output waveguide 105 which are used only for wavelength compensation are connected to the output side (right lower side in the Figure) of the output side slab-waveguide 109. The output waveguides 104 have parabolically flaring connecting portions. The wavelength compensation output waveguide 105, on the other hand, has a tapering connecting portion.

Figure 3A:
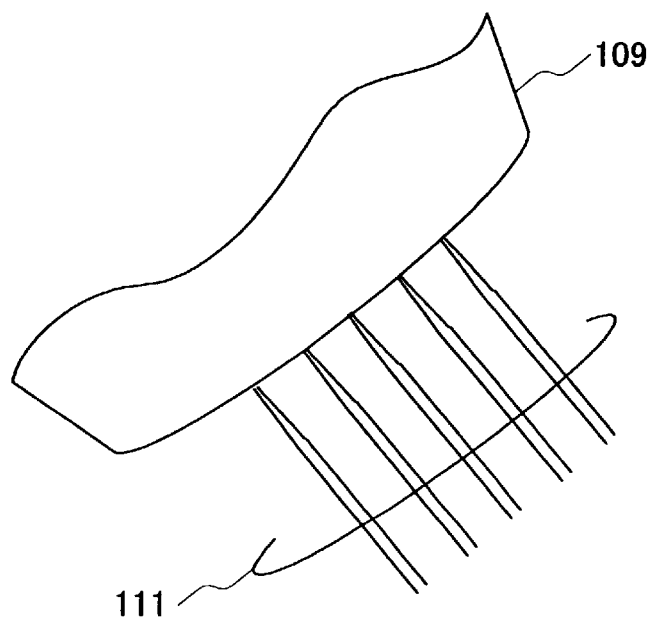
FIGS. 3(a) and 3(b) are drawings showing a first shape of the connection portion of the output waveguide and the optical spectral shape from the arrayed waveguide grating.

FIGS. 3(a) to 6(b) show various shapes of connecting portions of the output waveguides in the neighborhood of the output terminal of the general output side slab-waveguide and the spectrum shapes of the light signal output from the arrayed waveguide grating. FIG. 3(a) shows a state that an output waveguide 111 having the same shape as the waveguide compensation output waveguide 105 shown in FIG. 2 is connected to the output side of the output side slab-waveguide 109. In this example, the output waveguides 111 each have a tapering connecting portion. Thus, the solid curve spectrum shape of the light signal shown in FIG. 3(b) is sharper than the dashed curve reference spectrum shape. Generally, the thinner the connecting portion of the output waveguide 111, the spectrum shape of the corresponding light signal outputted from the arrayed waveguide grating is the sharper. However, with a connecting portion having a sharpness exceeding a certain extent, the spectrum shape rather turns to a dull shape.

Figure 3B:
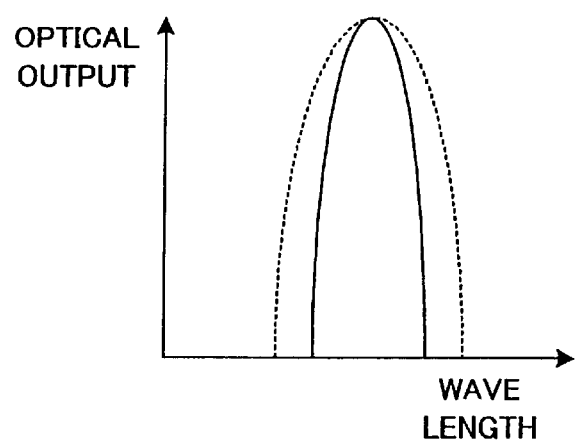
Figure 4A:
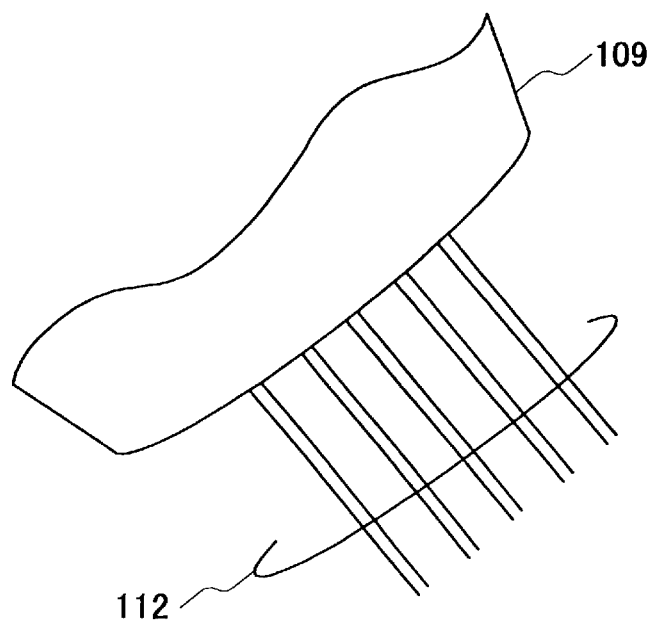
FIGS. 4(a) and 4(b) are drawings showing a second shape of the connection portion of the output waveguide and the optical spectral shape from the arrayed waveguide grating.
Figure 4B:
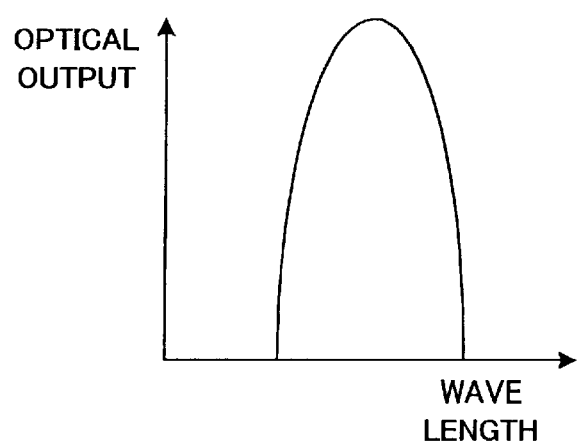

FIG. 4(a) shows a state that straight output waveguides 112 having a fixed width are connected to the output side of the output side slab-waveguide 109. In this case, the spectrum shape as shown in FIG. 3(b) is obtained. This spectrum shape is the same as the dashed curve reference spectrum shape shown in FIG. 3(b).

Figure 5A:
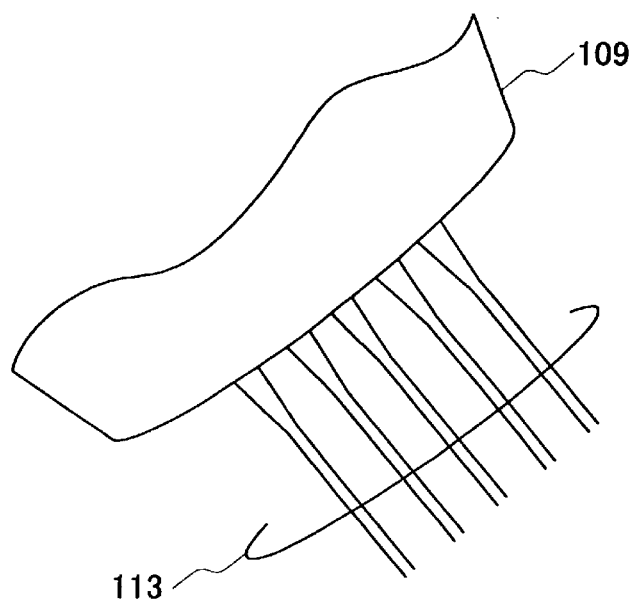
FIGS. 5(a) and 5(b) are drawings showing a third shape of the connection portion of the output waveguide and the optical spectral shape from the arrayed waveguide grating.

FIG. 5(a) shows a state that output waveguides 113 having connecting portions flaring with a slight angle are connected to the output side of the output side slab-waveguide 109. In this example, the solid curve spectrum shape as shown in FIG. 3(B) is obtained. This shape is broader than the dashed curve reference spectrum shape.

Figure 6A:
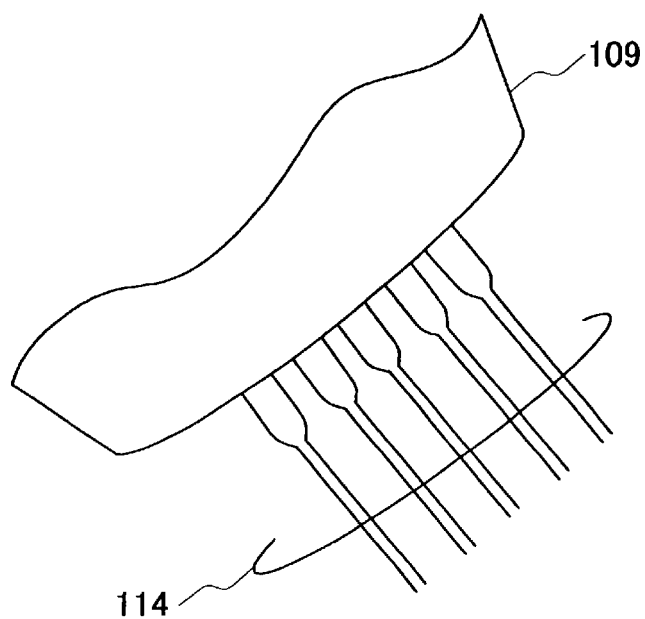
FIGS. 6(a) and 6(b) are drawings showing a fourth shape of the connection portion of the output waveguide and the optical spectral shape from the arrayed waveguide grating.
Figure 6B:
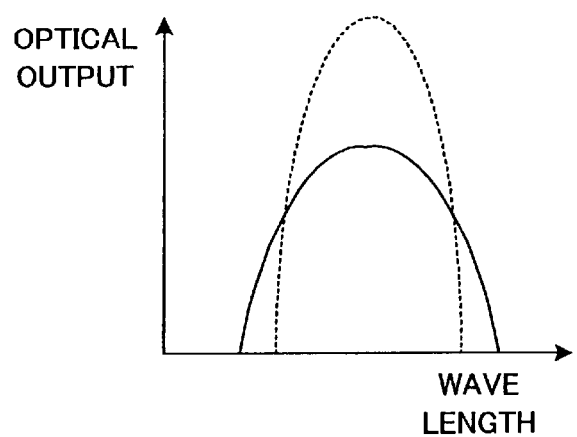
Figure 7:
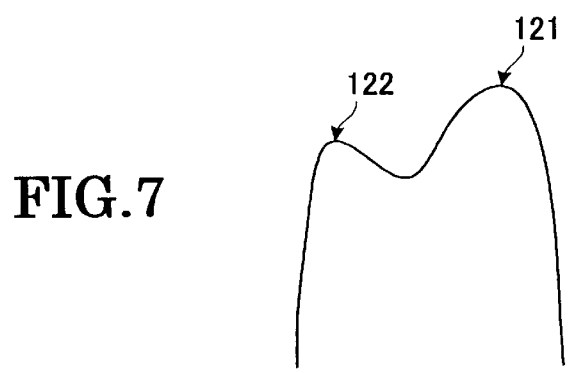
FIGS. 7 to 10 are drawings showing general spectrum shapes other than parabola shapes.
Figure 8:
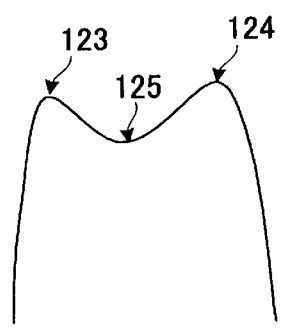

FIG. 6(a) shows a state that output waveguides 114 having a shape like the output waveguides 104 shown in FIG. 2 are connected to the output side of the output side slab-waveguide 109. In this case, the solid curve spectrum shape as shown in FIG. 6(b) is obtained. This spectrum shape, compared to the dashed curve reference spectrum shape, is dull with a flat top. Although this flat top spectrum shape is excellent for the purpose of making the loss variations in the ITU grid band as less as possible, its top portion has no substantial great level variation. With this spectrum shape, therefore, it is difficult to detect the center wavelength, resulting in center wavelength compensation accuracy deterioration. For the center wavelength detection purpose, the solid curve spectrum shape as shown in FIG. 3(b) obtainable by using the tapered output waveguides 111 as shown in FIG. 3(a) is most preferred.

As will be understood from the above considerations, in the output side slab-waveguide 109 in the embodiment shown in FIG. 2 a preferred spectrum shape is obtainable with the plurality of output waveguides 104 in the state of use of the product. The wavelength compensation output waveguide 105 permits obtaining a preferred spectrum shape for the detection and high accuracy compensation of the center wavelength. As for the spectrum shape of the light signal outputted from the wavelength compensation output waveguide 105 the shape of the neighborhood of the portion connected to the output side slab-waveguide 109 can be contrived to obtain spectrum shapes similar to a shape other than such parabolic shape, and among such spectrum shapes those suited for the wavelength compensation output waveguide 105 can be selected.

FIGS. 7 to 10 show general spectrum shapes other than polabola shapes. These spectrum shapes will now be described in view of the center wavelength detection. The shape shown in FIG. 7 has two, i.e., a higher and a lower level, peaks 121 and 122, and it is thus asymmetric as a whole. Therefore, it is difficult to specify the center wavelength in this shape. The shape shown in FIG. 8 has two peaks 123 and 124 of the same level. The bottom position 125 between the two peaks may correspond to the center wavelength. In this case, however, it is difficult to specify the center wavelength because of the presence of a plurality of same level points. Particularly, as shown FIG. 8, the bottom portion 125 may be deviated from the two peaks 123 and 124. In this case, the bottom portion 125 is no longer the center wavelength position.

Figure 9:
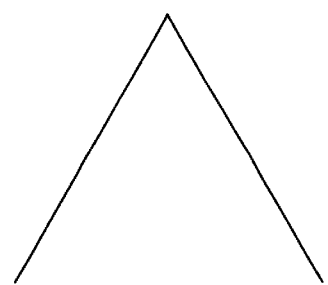
Figure 10:
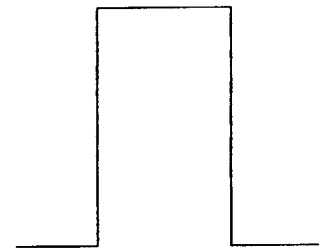

FIG. 9 shows a triangular spectrum shape. In such shape constituted by straight ascending and descending portions, it is ready to detect the center wavelength. FIG. 10 shows a spectrum shape having straight rising and falling portions.

With such shape, it is possible to relatively readily calculate the half value width. Ready center wavelength calculation is obtainable even if the flat portion length (i.e., spectrum width) is relatively large. Of course, with a short flat portion length, the accuracy of the center wavelength detection is high.

Figure 11:
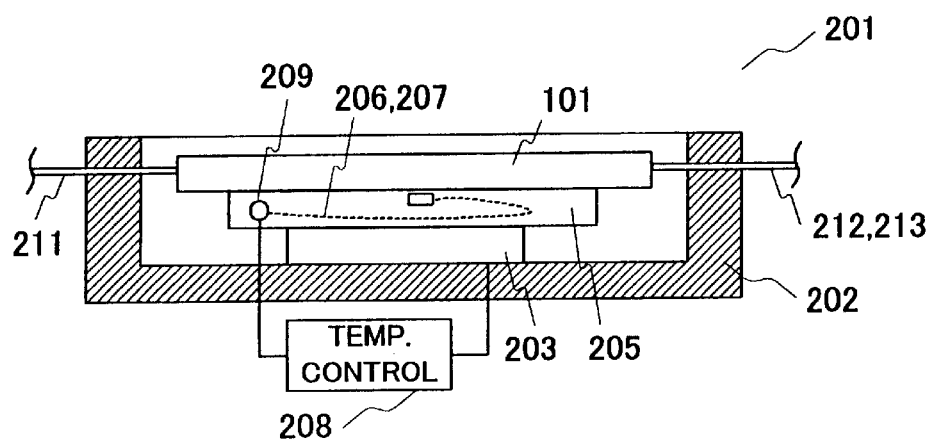
FIG. 11 is a sectional view showing the construction of an arrayed waveguide grating module using the first embodiment arrayed waveguide grating described above.

FIG. 11 shows the summary of the construction of an arrayed waveguide grating module using the first embodiment arrayed waveguide grating described above. The arrayed waveguide grating module 201 as illustrated comprises a box-like case 202, a temperature control element 203 constituted by a Velch element disposed on the bottom of the case 202 for heating or cooling the same, an arrayed wavelength grating 101 and a metal plate 205 intervening between the arrayed waveguide grating 101 and the temperature control element 203. In this embodiment, a high heat conductivity copper plate is used as the metal plate 205. The metal plate 205 has a size greater than the size of contact with the temperature control element 203 for enlarging the temperature control region thereof.

The metal plate 205 has a groove, in which a temperature sensor 206 is buried together with the a high heat conductivity material 207. The detected temperature signal is inputted to a temperature control circuit 209 for controlling the temperature of the temperature control element 203. The temperature sensor 206 buried in the metal plate 205 is led out from a position 209. In this embodiment, a thermistor is used as the temperature sensor 206.

Optical fibers 211 to 213 are led out from the side of the input waveguides 103 of the arrayed waveguide grating 101 shown in FIG. 1 and the side of the output waveguides 104 and wavelength compensation output waveguide 105 to the outside of the case 20. Of these optical fibers, the optical fiber 211 has one terminal connected to the input waveguides 103 and the other terminal connected to the light source side (not shown). The optical fiber 212 has one terminal connected to the output waveguides 104 and the other terminal connected to a circuit part (not shown) for processing demultiplexed light signals. The remaining optical fiber 213 has one terminal connected to the wavelength compensation output waveguide 105 and the other terminal connected to a wavelength detection circuit (not shown).

Figure 12:
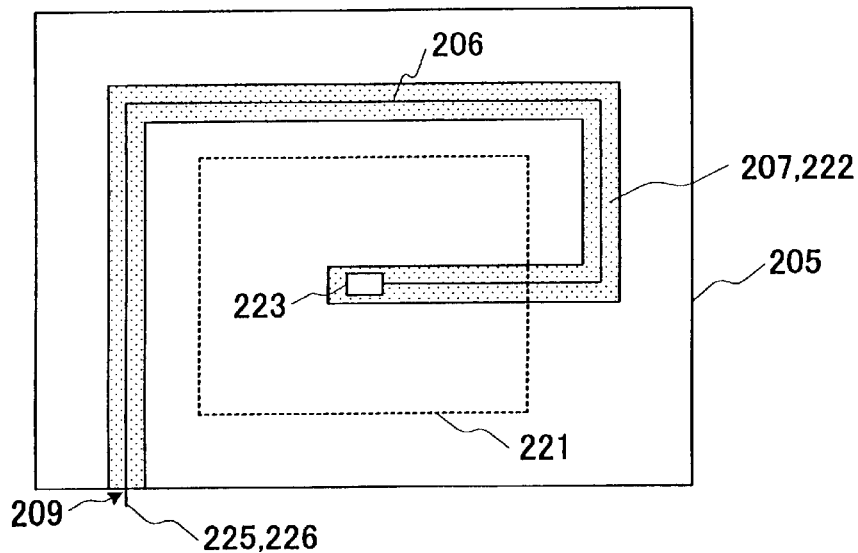
FIG. 12 is a plan view showing the metal plate with the temperature sensor buried therein.

FIG. 12 shows the metal plate with the temperature sensor buried therein. The metal plate 205 has a temperature detection region 221 shown enclosed in the dashed rectangle, which is in contact with the channel waveguide array 107 and the input and output side slab-waveguides 108 and 109 in the arrayed waveguide grating 101 shown in FIG. 1. By detecting the temperature of this region 221 with high accuracy and controlling the detected temperature to a predetermined temperature, it is possible to prevent characteristic changes due to temperature variations in the arrayed waveguide grating 101.

The metal plate 205 has a groove 222 formed in its front surface, and the temperature sensor 206 is buried together with the high heat conductivity material 207 in the groove 222. The temperature sensor 206 has a temperature detecting portion 223, which is located at one end of it and buried in the substantial center of the temperature detecting region 221. From this position, a pair of lead lines 225 and 226 are led in a spiral fashion in the metal plate 205 and to the outside from the position 209. The pair lead lines 225 and 226 are relatively thin wires.

In such arrayed waveguide grating module 201, the optical fiber 211 shown in FIG. 11 is connected to a monitor light source (not shown), and the optical fiber 13 is connected to the wavelength detection circuit (not shown). Then, the control temperature is set in the temperature control circuit 208 such that the wavelength detected in the wavelength detection circuit has a predetermined value. The wavelength compensation output waveguide 105 and the output waveguides 104 are designed such that the wavelengths inputted to them are in a predetermined relation. Thus, with the detection of the temperature of the metal plate 205 and the control of the detected temperature of the metal plate 205 in the temperature control circuit 208 such that the light led out from the light source and through the wavelength compensation output waveguide 105 has a predetermined wavelength, a light signal having a desired wavelength is inputted to each of the output waveguides 104.

When the ambient temperature is changed from the initial preset temperature, the arrayed waveguide grating 101 and the temperature sensor 206 receive thermal feedback such as to reflect the external temperature. In consequence, the operating point is usually deviated from the initial preset temperature. In this embodiment arrayed waveguide grating module 201, however, the temperature detecting portion 223 of the temperature sensor 206 is buried in the metal plate 205, and the groove 222 is closed by the arrayed waveguide grating 101. Furthermore, as shown in FIG. 12, the pair lead lines 225 and 226 which are liable to provide thermal feedback to the temperature detecting portion 223 are buried together with the high heat conductivity material 207 in the metal plate 205. Moreover, the lead lines 225 and 226 are not led out through the metal plate 205 from the position of the temperature detecting portion 223 in a shortest distance fashion, i.e., a straight fashion, but are led out in a sort of spiral fashion as one form of curve to cover an increased distance.

Thus, the ambient temperature can not be fed back from the position 209 along the lead lines 225 and 226 to the temperature detecting portion 223, but the heat energy corresponding to the change in temperature is absorbed in the metal plate 205 itself through the lead lines 225 and 226 therein, which cover a relatively long distance. The metal plate 205 itself is temperature controlled by the temperature control element 203 to a predetermined temperature. Thus, the effects of the ambient temperature from the position 209, like the effects of the ambient temperature in the other portion of the metal plate 205 surrounding the temperature control element 203, are weakened as one goes inwardly of the metalplate 205. In the temperature detecting region 221 which is located in the neighborhood of the center of the metal plate 205, the temperature of the lead lines 225 and 226 thus becomes substantially the same as the temperature of metal in that portion. In practice, the ambient temperature can not be thought to be fed back to the temperature detecting portion 223.

For the above reason, in the arrayed waveguide grating module 201 the temperature detecting portion 223 can accurately measure the temperature of the portion of the arrayed waveguide grating 101 corresponding to the temperature detection region 221 without being adversely affected by the ambient temperature. It is thus possible to realize stable temperature control at all times irrespective of ambient temperature changes.

Figure 13:
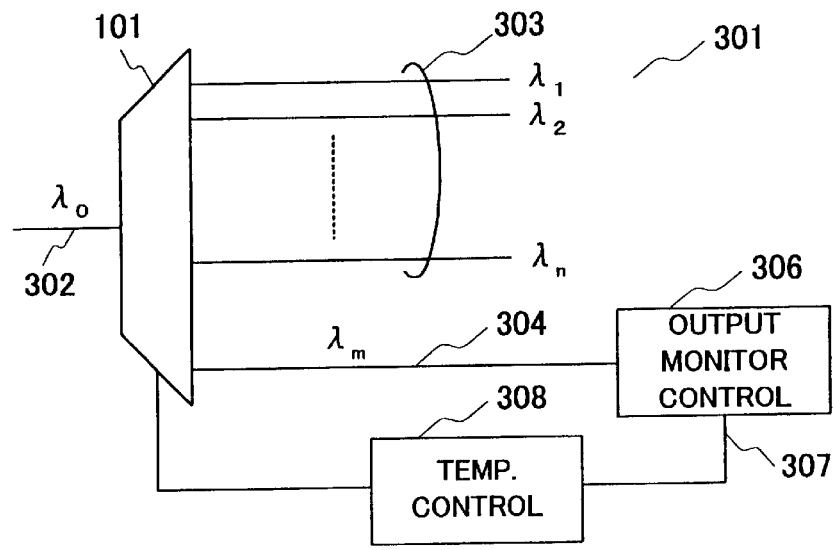
FIG. 13 is a block diagram showing an essential part of an optical communication device using an arrayed waveguide grating as a second embodiment of the present invention.

FIG. 13 shows an essential part of an optical communication device using an arrayed waveguide grating as a second embodiment of the present invention. In this optical communication device 301, the arrayed waveguide grating 11 shown in FIG. 1 as the first embodiment is used. An optical fiber 302 having one terminal connected to a light source (not shown) has the other terminal connected to the input side of the arrayed waveguide grating 101. To the output side of the arrayed waveguide grating 101 a reconnected optical fibers 303 corresponding to the output waveguides 104 (see FIG. 1) and an optical fiber 304 corresponding to the wavelength compensation output waveguide 105 are connected. Denoting the wavelength of a light signal outputted from the light source (not shown) by $\lambda_0$, lights of wavelengths $\lambda_1$ to $\lambda_n$ are outputted from the optical fiber 303. A light of wavelength $\lambda_m$ is outputted from the optical fiber 304.

An output monitoring controller 306 is connected to the output side of the optical fiber 304. The output monitoring controller 306 outputs a monitor signal 307 which is inputted to a temperature control circuit 308. The temperature control circuit 308 holds the wavelengths of the light signals outputted from the optical fiber 303 to desired values at all times by controlling the temperature of the arrayed waveguide grating 101.

Figure 14:
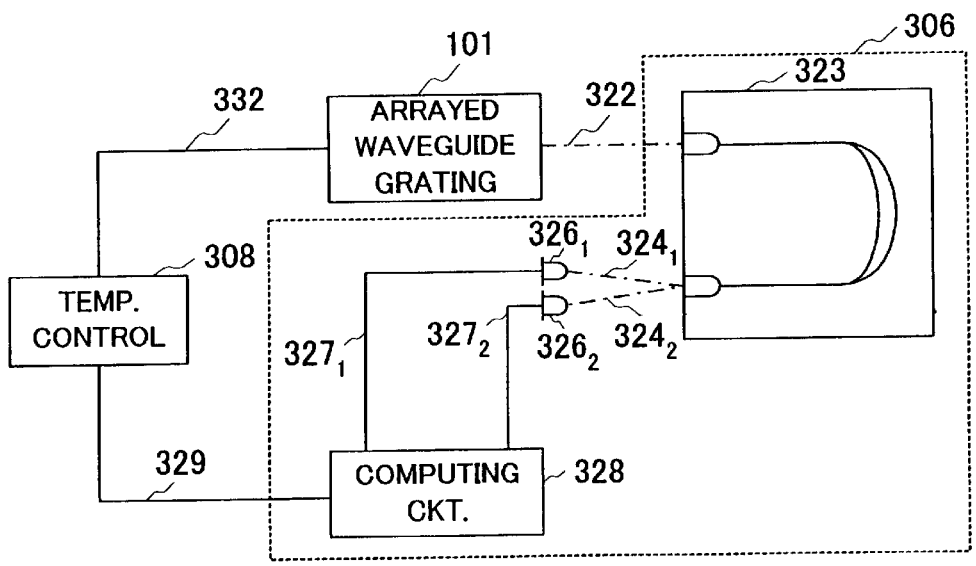
FIG. 14 is a block diagram showing an essential part of the optical communication device shown in FIG. 13.

FIG. 14 specifically shows an essential part of the optical communication device shown in FIG. 13. As shown, the output monitoring controller 306 a Mach zender circuit 323 as a two-output interferometer for receiving the a laser light 322 of wavelength $\lambda_m$ outputted from the arrayed waveguide grating 101, a first and a second photo-diode $326_1$ and $326_2$ for receiving a first and a second laser beam signal $324\text{-}_1$ and $324_2$, respectively, outputted in respective directions from the Mach zender circuit 323, and a computing circuit 328 for computing reception outputs $327_1$ and $327_2$ from the photo-diodes $326_1$ and $326_2$. The computation result output 329 of the computing circuit 328 is inputted to the temperature controller 308. The wavelength of the arrayed waveguide grating 101 is controlled to a desired value according to the temperature control output 332 of the temperature control circuit 308. The wavelength control may also be obtained by controlling a drive current in a laser diode (not shown) as a component of the arrayed waveguide grating 101.

In the second embodiment, the Mach zender circuit 323 is a single-side input/output terminal interferometer. Although the Mach zender circuit 323 of single-side input/output terminal interferometer is by no means limitative, compared to the arrangement with the input and output terminals disposed in the opposite sides, the use of the single-side input/output interferometer, in which not only the input terminal but also the output terminal is disposed on one side of the circuit, may contribute to the module size reduction. In addition, the arrangement in which the optical path difference between the input and output terminals is obtained in a figure R curved portion, is desired from the standpoint of the element size reduction.

Figure 15:
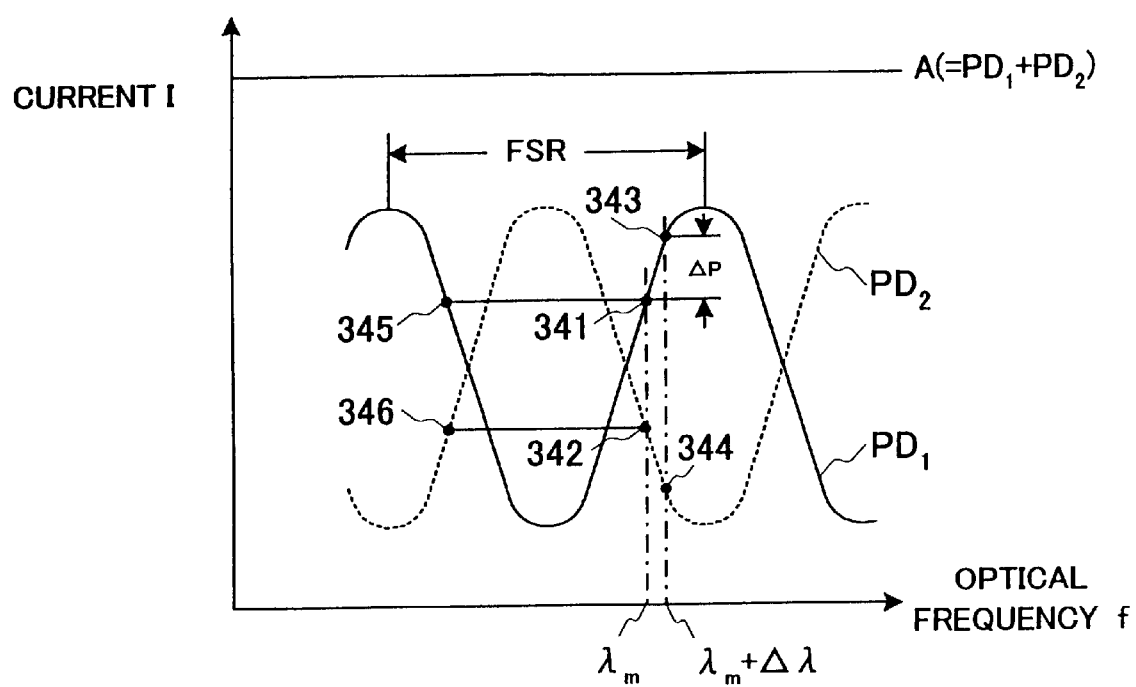
FIG. 15 is a graph for describing the relation between the current output of the first and second photo-diodes as a result of the light signal reception and the computation result obtained in the computing circuit in the second embodiment.

FIG. 15 is a graph for describing the relation between the current output of the first and second photo-diodes as a result of the light signal reception and the computation result obtained in the computing circuit. With light frequency changes, the current as the reception output $327_1$ of the first photo-diode $326_1$ is changed as a sinusoidal wave in a predetermined cyclic free spectral range (hereinafter referred to as FSR) having a cycle period corresponding to one cycle of the loss wavelength characteristic. The current as the reception output $327_2$ of the second photo-diode $326_1$ is changed likewise as 180-degree out-of-phase output. This embodiment of the device is designed such that these currents are equal to that in the ITU grid with the cyclic FSR predetermined by ITU (International Telecommunication Unison).

Since the reception outputs $327_1$ and $327_2$ of the first and second photo-diodes $326_1$ and $326_2$ are 180-degree out-of-phase with each other, denoting these currents by $I_{PD1}$ and $I_{PD2}$ respectively, their sum is fixed irrespective of the light signal frequency.

The computing circuit 328 computes the ratio A between the current $I_{PD1}$ as the reception output of the first photo-diode $326_1$ and the sum of the currents $I_{PD1}$ and $I_{DP2}$, as given by the following equation 2.

$$A = I_{PD1}/(I_{PD1}+I_{PD2}) \quad (2)$$

The arrayed waveguide grating 101 outputs the temperature control signal 332 such that the ratio A has a predetermined value at all times. The two currents $I_{PD1}$ and $I_{PD2}$ are changed periodically with an interval of one cycle or longer. It is thus possible to set a predetermined wavelength in a broad wavelength range. For example, by setting the temperature of the arrayed waveguide grating 101 to the neighborhood of $t_1$, the wavelength $\lambda_m$ of the laser beam signal 322 can be held at a particular light signal wavelength $f_1$ or a predetermined neighborhood light frequency. Also, by controlling the temperature of the arrayed waveguide grating 101 to a different temperature in the neighborhood of $t_2$ from $t_1$, it is possible to provide the output with a different light wavelength in the neighborhood of $f_2$ as the laser beam signal 322 and hold the light frequency of this signal at $f_2$ or a predetermined neighborhood light frequency thereof.

Figure 5B:
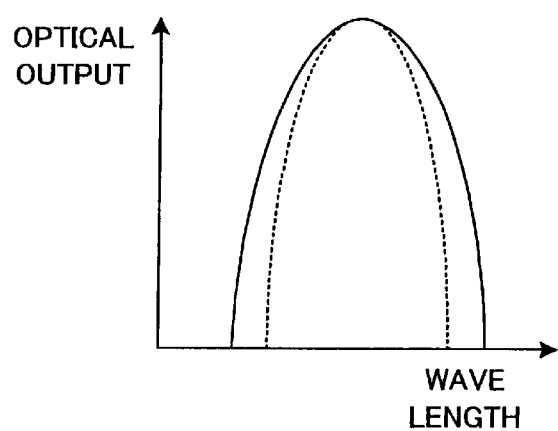

Particularly, highly accurate wavelength control is possible by setting the light signal frequency as subject of control at a desired position corresponding to sharply tilted positions of the curves representing the currents $I_{PD1}$ and $I_{PD2}$ shown in FIG. 15. As an example, wavelength $\lambda_m$ in FIG. 5 is assumed to be the subject of control. In this assumption, the points on the curves of the currents $I_{PD1}$ and $I_{PD2}$ corresponding to the wavelength $\lambda_m$ are operating points 341 and 342. Also, the points on the curves of the currents $I_{PD1}$ and $I_{PD2}$ corresponding to a wavelength $(\lambda_m+\Delta\lambda)$ deviated by a slight amount $\lambda\Delta$ to the longer wavelength side are operating points 343 and 344.

In this case, by denoting the current difference between the two operating points 341 and 343 by $\Delta P$, the ratio A shown in the equation (2) is $P/(I_{PD1}+I_{PD2})$. In sharply tilted portions of the curves of the currents $I_{PD1}$ and $I_{PD2}$ the difference $\Delta P$ takes a relatively large value, and the wavelength of the laser beam signal 322 can be highly accurately set to the neighborhood of the wavelength $\lambda_m$.

Considering one cycle FSR of the sinusoidal wave shown in FIG. 15, the wave curve has two further points 345 and 346 corresponding to entirely the same levels of the currents $I_{PD1}$ and $I_{PD2}$ as the respective two operating points 341 and 342. These points correspond to the wavelength deviation by one half of the cycle FSR. At these two points 345 and 346, however, the sign of the current $I_{PD1}$ as the nominator in the equation (2) when the wavelength is increased or reduced by $\Delta\lambda$ is opposite. The computation result is thus different, and it is possible to specify the wavelength of the control subject in the wavelength range corresponding to one FSR cycle of the sinusoidal wave.

Figure 16:
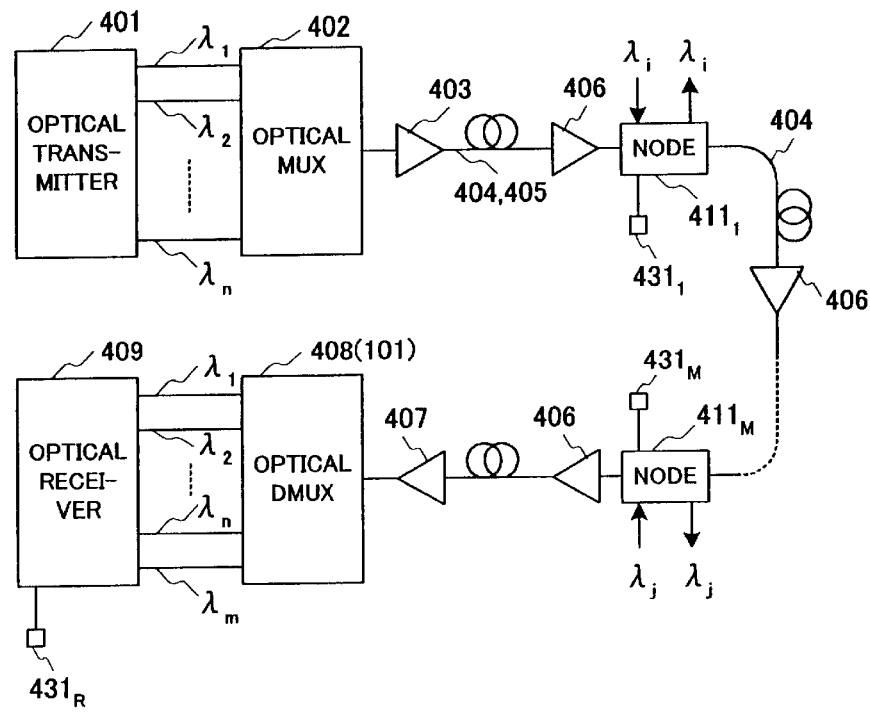
FIG. 16 is a block diagram showing the construction of an optical communication system as a third embodiment of the present invention.

FIG. 16 shows a summary of the construction of an optical communication system as a third embodiment of the present invention. In this optical communication system, light signals of N channels of waveguides $\lambda_1$ to $\lambda_N$ outputted to an optical transmitter connected to an SONET (Synchronous Optical Network) system (not shown) provided on the transmission side, are multiplexed in an optical multiplexer (MUX) 402, then amplified in a booster amplifier 403 and then outputted to an light signal transmitting line 404. The wavelength multiplexed light signal 405 is adequately amplified in an in-line amplifier 406, and then led through a pre-amplifier 407 to an optical demultiplexer (DMUX) 408 for demultiplexing to separate the initial wavelengths $\lambda_1$ to $\lambda_N$ which are received in an optical receiver 409. On the light signal transmitting line 404, a suitable number of nodes (OADM) $411_1$ to $411_M$ are disposed. Light signals of desired wavelengths are inputted to and outputted from the nodes $411_1$ to $411_M$. The optical demultiplexer 408 is constituted by the arrayed waveguide grating 101 as shown in FIG. 1.

Figure 17:
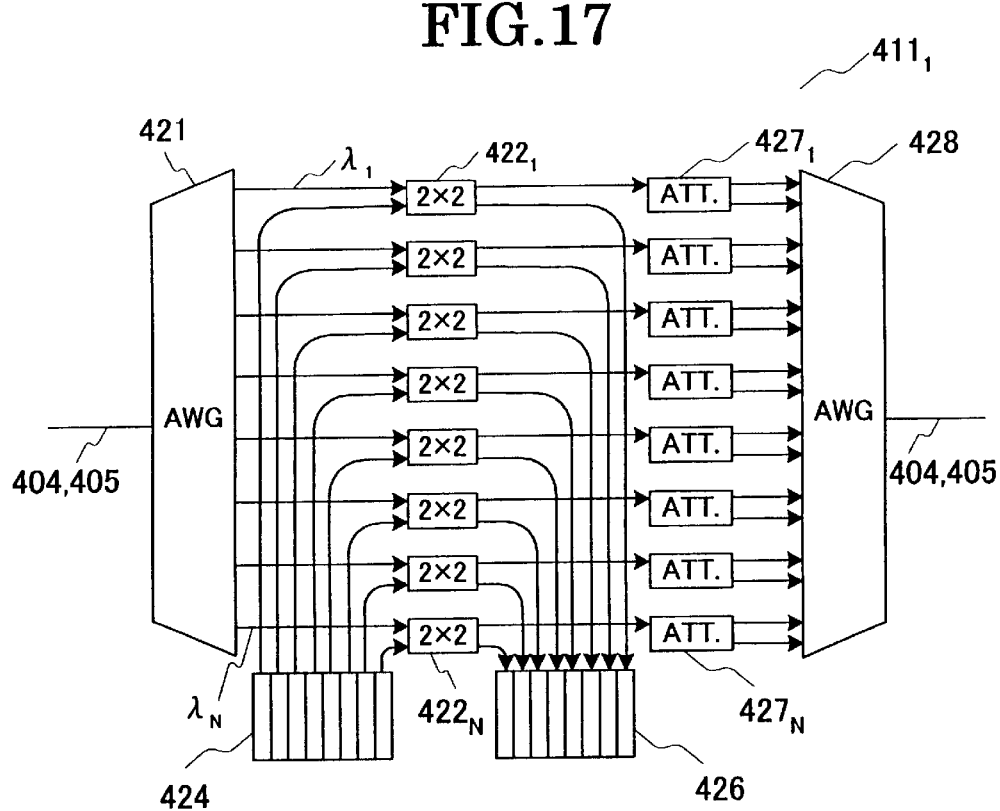
FIG. 17 is a block diagram showing the construction of the nodes in the third embodiment.
Figure 18:
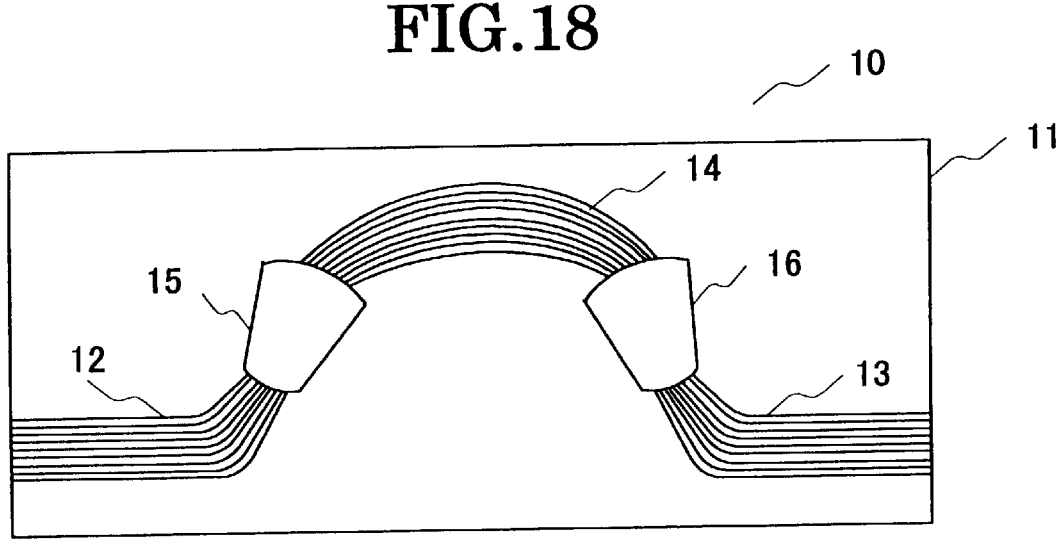
FIG. 18 is a plan view showing the overall construction of a prior art arrayed waveguide grating.
Figure 19:
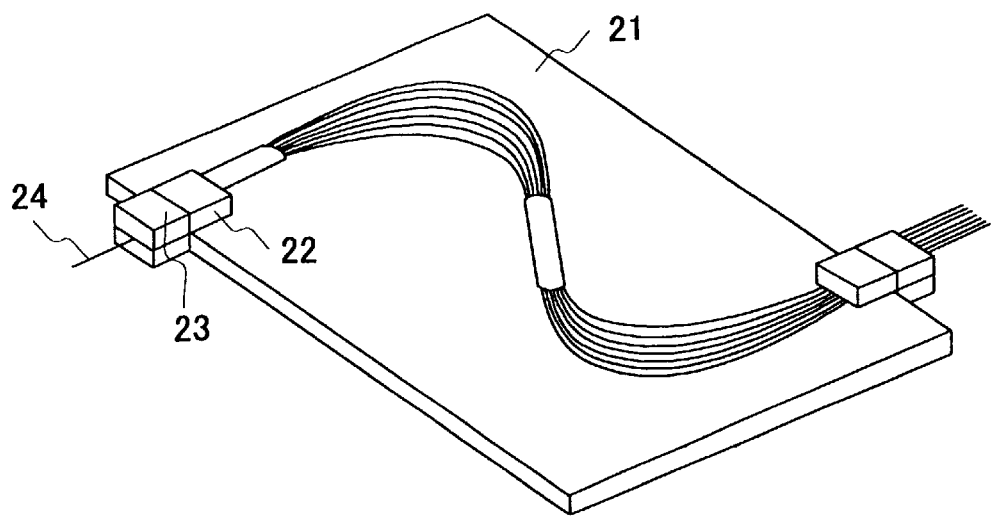
FIG. 19 shows the construction of a prior art arrayed waveguide grating capable of selected wavelength compensation.
Figure 20:
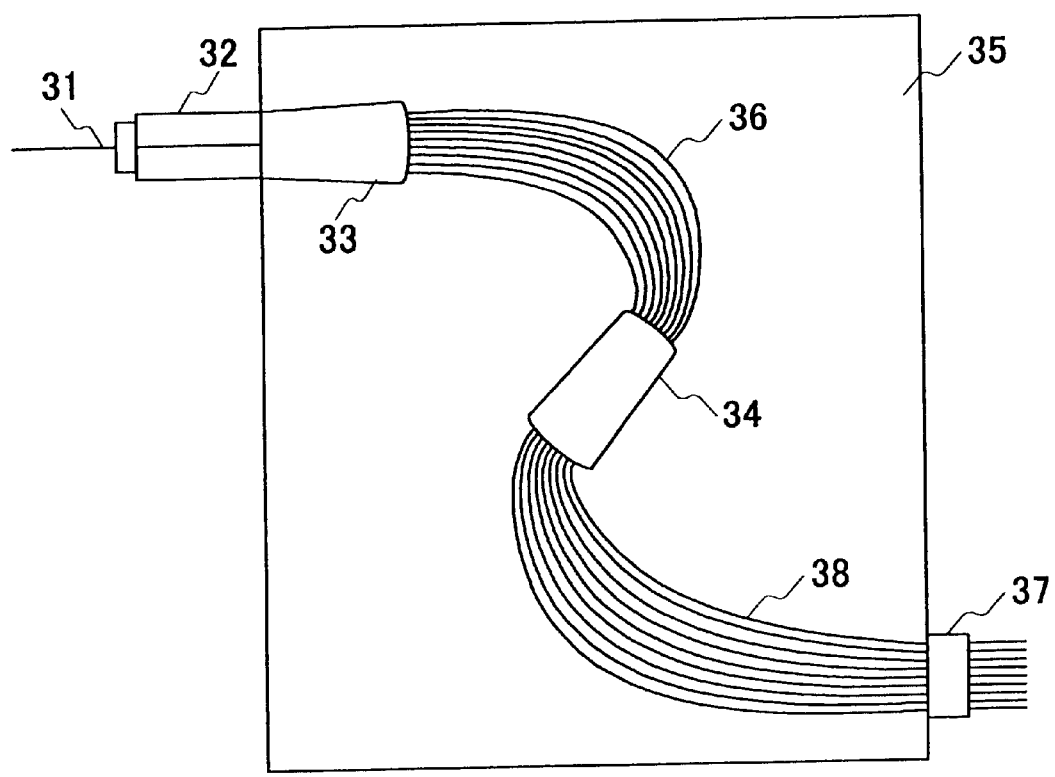
FIG. 20 shows the construction of another prior art arrayed waveguide grating capable of selected wavelength compensation.
Figure 21:
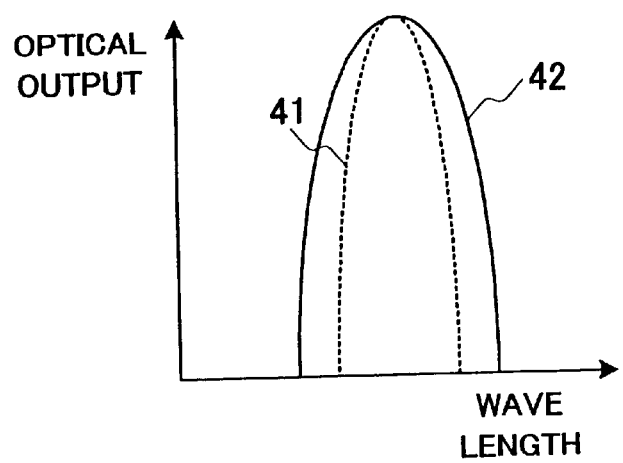
FIG. 21 shows an example of the spectrum shape of the light signal outputted from the arrayed waveguide grating.
Figure 22:
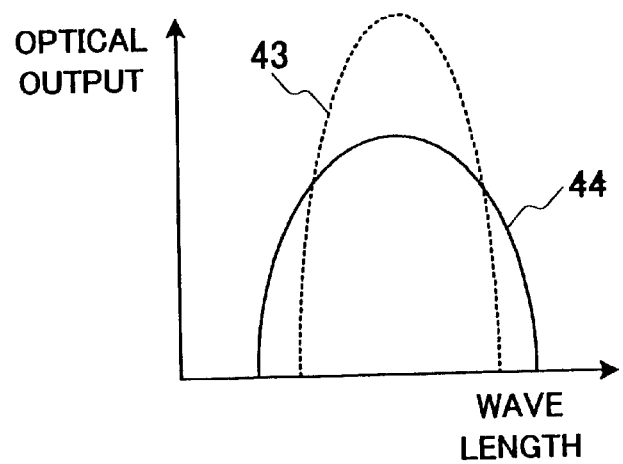
FIG. 22 shows a different example of the spectrum shape of the light signal outputted from the arrayed waveguide grating.

FIG. 17 shows a summary of the construction of the nodes. Here, the first node $411_1$ is shown (SEE FIG. 16), but the second to M-th modes $411_2$ to $411_M$ also have the same construction. The signal from the light signal transmitting line 404 shown in FIG. 23 is inputted to an input side arrayed waveguide grating 421 in the first node $411_1$ for demultiplexing to separate light signals in N channels of wavelengths $\lambda_1$ to $\lambda_N$. The separated light signals of the wavelengths $\lambda_1$ to $\lambda_N$ are dropped by two-input two-output optical switches $422_1$ to $422_N$, which are each provided for each of wavelengths $\lambda_1$ to $\lambda_N$, to the node side receiver 426. Also, light signals transmitted from the wavelengths $\lambda_1$ to $\lambda_N$ are added from a node side transmitter 424. The outputs of the two-input two-output optical switches $422_1$ to $422_N$ are gain controlled in respective attenuators (ATT) $427_1$ to $427^N$ and inputted to an output side arrayed waveguide grating 428. The output side arrayed waveguide grating 428 is an element having construction inverse to the output side arrayed waveguide grating 421, and it multiplexes the light signals in the N channels of the wavelengths $\lambda_1$ to $\lambda_N$ to output the light signal 405 obtained by the multiplexing to the light signal transmitting line 404.

As shown above, the first node $411_1$ shown in FIG. 17 and also the second to M-th nodes $411_2$ to $411_M$ and the optical demultiplexer 408 all use the arrayed waveguide grating 101 shown in FIG. 1. The above light signal of the wavelength $\lambda_m$ outputted from the output side waveguide (i.e. monitor signal waveguide) when monitor light signal is inputted from input side waveguide, is progressively monitored for wavelength compensation of the output side waveguides, from which the light signals of the wavelengths $\lambda_1$ to $\lambda_N$ are outputted. To this end, as shown in FIG. 16, the nodes $411_1$ to $411_M$ and the optical receiver 409 are provided with output monitor controllers $431_1$ to $431_M$ and $431_R$, respectively.

The arrayed waveguide grating 101, even when it is used as multiplexer, can do wavelength compensation likewise by inputting the monitor light signals from the intrinsic output side waveguides and progressively monitoring the light signal of the wavelength .m outputted from the intrinsic input side waveguides (i.e., monitor light signal waveguides). Although not shown in this embodiment, it is further possible to obtain compensation with respect to the arrayed waveguide grating 101 on the side of the output side arrayed waveguide grating 428 in the optical transmitter 401 and the nodes $411_1$ to $411_M$. To this end, output monitoring controllers may be provided.

In the above second embodiment, the wavelength compensation is performed by making wavelength measurement with the output monitoring controller using the Mach zender circuit and two diodes, it is also possible to make wavelength compensation of an arrayed waveguide grating or an arrayed waveguide grating module by using a wavelength meter and hence the result output thereof.

As has been described in the foregoing, according to the first to eighth and twenty sixth to thirty third aspects of the present invention, the second waveguide provided as at least one of the output waveguides is different from the first waveguides, and it is thus possible to obtain measurement, which is different from the measurement in the case of using the first waveguides. By using the result of this measurement, it is possible to make more accurate center wavelength compensation of each waveguide of the arrayed waveguide grating.

Particularly, according to the fourth and twenty ninth aspects of the present invention, the spectrum of the light signal outputted from the second output waveguide as one of the output waveguides can be held with less loss variation state because of its narrow spectral width compared to the spectrum of the light signals outputted from the first output waveguides.

According to the fifth and thirteenth aspects of the present invention, the spectrum of the light signal outputted from the second output waveguide has a sharp peak compared to the case of the usual waveguides as the output waveguides, and thus it can be readily specified.

According to the sixth to eighth and thirty first to thirty third aspects of the present invention, only the portion of the monitor light signal output waveguide on the side thereof connected to the output side slab-waveguide is made different from the case of the first output waveguides. This arrangement thus can not only be readily provided but also permits variously contriving the spectrum shape and received light signal level.

According to the ninth, tenth, thirty fourth and thirty sixth aspects of the present invention, the arrayed waveguide grating module is constructed by assembling the arrayed waveguide grating together with other components. Thus, unlike the case of, for instance, assembling the arrayed waveguide grating such as to permit the wavelength compensation itself to be made within the module, it is possible to obtain such effects as obtaining an efficient component arrangement in the module itself or saving the space of disposition of a plurality of components. Furthermore, by assembling precise components, it is possible to improve the accuracy of the wavelength compensation or stabilizing the product quality.

According to the eleventh to fifteenth and thirty sixth to fortieth aspects of the present invention, the wavelength compensation with respect to the light signals outputted from the first waveguides at the time of the input of the light signals from the input waveguides, is performed by inputting the monitor light signal to the arrayed waveguide grating module and detecting the monitor light signal outputted from the exclusive monitor light signal waveguide. Thus, the wavelength compensation processing is possible even in the state of use of the first waveguides.

In the optical communication device according to the sixteenth, seventeenth, twenty fourth, twenty fifth, forty first, forty second, forty ninth and fiftieth aspects of the present invention, at the time of the arrayed waveguide grating module check the arrayed waveguide grating can be adjusted by inputting the monitor light signal for checking from either one of the input waveguides such that the monitor light signal outputted from the monitor light signal waveguide has a predetermined wavelength, and a signal processing using the wavelength compensated light signals outputted from the first waveguides of the arrayed waveguide grating can be started by inputting the actually used light signals from the input waveguides of the adjusted arrayed waveguide grating module.

According to the eighteenth to twenty third and forty third to forty eighth aspects of the present invention, the wavelength of the component constituted by the arrayed waveguide grating is compensated for. It is thus possible to obtain highly reliable satisfactory communication. Particularly, according to the twenty fourth aspect of the present invention, no expensive wavelength meter is used, and it is thus possible to reduce cost of the optical communication system itself.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An arrayed waveguide grating comprising:
   one or more input waveguides;
   an input side slab-waveguide connected to the output side of the input waveguide or waveguides;
   a plurality of arrayed waveguides formed on the side of the input side slab-waveguide opposite the input waveguide or waveguides;
   an output side slab-waveguide connected to the other terminal of the arrayed waveguides;
   a plurality of first output waveguides connected to the output side slab-waveguide on the side thereof opposite the arrayed waveguides; and
   at least one second output waveguide formed together with the first output waveguides on the side of the output side slab-waveguide opposite the arrayed waveguides;
   the afore-said components being all formed on a substrate and the second output waveguide outputting an optical spectrum different from the optical spectral outputted from the other output waveguides.

2. An arrayed waveguide grating comprising:
   one or more input waveguides;
   an input side slab-waveguide connected to the output side of the input waveguide or waveguides;
   a plurality of arrayed waveguides formed on the side of the input side slab-waveguide opposite the input waveguide or waveguides;
   an output side slab-waveguide connected to the other terminal of the arrayed waveguides;
   a plurality of first output waveguides connected to the output side slab-waveguide on the side thereof opposite the arrayed waveguides; and
   at least one second output waveguide formed together with the first output waveguides on the side of the output side slab-waveguide opposite the arrayed waveguides;
   the afore-said components being all formed on a substrate and a connecting portion of the second output waveguide with respect to the output side slab-waveguide having a shape different from the shape of connecting portions of the first output waveguides with respect to the output side slab-waveguide.

3. The arrayed waveguide grating according to claim 1, wherein the second output waveguide constituting the output waveguides is a monitor light waveguide for wavelength monitoring.

4. The arrayed waveguide grating according to claim 1, wherein the second output waveguide constituting the output waveguides outputs an output spectrum having a narrower spectral width than the spectral width of the output optical spectra of the first output waveguides.

5. The arrayed waveguide grating according to claim 1, wherein the second output waveguide constituting the output waveguides outputs an optical spectrum having a sharper peak than the peak of the optical spectra of the first output waveguides.

6. The arrayed waveguide grating according to claim 2, wherein the second output waveguide is a monitor light output waveguide and has a tapering connecting portion connected to the output side slab-waveguide.

7. The arrayed waveguide grating according to claim 2, wherein the second output waveguide is a monitor light output waveguide and has a straight connecting portion with a fixed width direction dimension and connected to the output side slab-waveguide, and the first output waveguides constituting the output waveguides have terminal portions with progressively increasing width direction dimensions as one approaches the output side slab-waveguide.

8. The arrayed waveguide grating according to claim 2, wherein the waveguides constituting the output waveguides have terminal portions with progressively increasing width direction dimensions as one approaches the output side slab-waveguide, the terminal portions of the first output waveguides having width direction dimensions increasing at an increased rate.

9. The arrayed waveguide grating according to claim 2, wherein the second output waveguide constituting the output waveguides is a monitor light waveguide for wavelength monitoring.

10. An arrayed waveguide grating comprising:
    at least one input waveguides;
    an input side slab-waveguide with the input side thereof connected to the output side of the input waveguide or waveguides;
    a channel waveguide array including a plurality of waveguides with lengths progressively increasing by a predetermined waveguide length difference, the input side of the waveguides being connected to the output side of the input side slab-waveguide;
    an output side slab-waveguide with the input side thereof connected to the output side of the plurality of waveguides constituting the channel waveguide array; and
    a plurality of waveguides as output waveguides each having one terminal connected to the output side of the output side slab-waveguide, the optical spectrum of the light outputted from a second waveguide as one of the output waveguides being different from the optical spectrum of the lights outputted from first waveguides as the remaining output waveguides.

11. An arrayed waveguide grating comprising:
    at least one input waveguides;
    an input side slab-waveguide with the input side thereof connected to the output side of the input waveguide or waveguides;
    a channel waveguide array including a plurality of waveguides with lengths progressively increasing by a predetermined waveguide length difference, the input side of the waveguides being connected to the output side of the input side slab-waveguide;
    an output side slab-waveguide with the input side thereof connected to the output side of the plurality of waveguides constituting the channel waveguide array; and
    a plurality of waveguides as output waveguides each having one terminal connected to the output side of the output side slab-waveguide, a connecting portion of the second output waveguide with respect to the output side slab-waveguide having a shape different from the shape of connecting portions of the first output waveguides with respect to the output side slab-waveguide.

12. The arrayed waveguide grating according to claim 10, wherein the second output waveguide constituting the output waveguides is a monitor light waveguide for wavelength monitoring.

13. The arrayed waveguide grating according to claim 10, wherein the second output waveguide constituting the output waveguides outputs an output spectrum having a narrower spectral width than the spectral width of the output optical spectra of the first output waveguides.

14. The arrayed waveguide grating according to claim 10, wherein the second output waveguide constituting the output waveguides outputs an optical spectrum having a sharper peak than the peak of the optical spectra of the first output waveguides.

15. The arrayed waveguide grating according to claim 11, wherein the second output waveguide is a monitor light output waveguide and has a tapering connecting portion connected to the output side slab-waveguide.

16. The arrayed waveguide grating according to claim 11, wherein the second output waveguide is a monitor light output waveguide and has a straight connecting portion with a fixed width direction dimension and connected to the output side slab-waveguide, and the first output waveguides constituting the output waveguides have terminal portions with progressively increasing width direction dimensions as one approaches the output side slab-waveguide.

17. The arrayed waveguide grating according to claim 11, wherein the waveguides constituting the output waveguides have terminal portions with progressively increasing width direction dimensions as one approaches the output side slab-waveguide, the terminal portions of the first output waveguides having width direction dimensions increasing at an increased rate.

18. The arrayed waveguide grating according to claim 11, wherein the second output waveguide constituting the output waveguides is a monitor light waveguide for wavelength monitoring.

* * * * *